(12) United States Patent
Kasparkova et al.

(10) Patent No.: US 12,070,932 B2
(45) Date of Patent: Aug. 27, 2024

(54) LAYERED NONWOVEN TEXTILE AND METHOD OF FORMING THE SAME

(71) Applicants: PFNONWOVENS HOLDING S.R.O., Prague (CZ); PFNONWOVENS CZECH S.R.O., Znojmo (CZ); PFN—GIC A.S., Znojmo (CZ)

(72) Inventors: Pavlina Kasparkova, Znojmo (CZ); Michael Kauschke, Chiemsee (DE); Zdenek Mecl, NovýŠaldorf-Sedlešovice (CZ)

(73) Assignees: PFNONWOVENS HOLDING S.R.O., Prague (CZ); PFNONWOVENS CZECH S.R.O., Znojmo (CZ); PFN—GIC A.S, Znojmo (CZ)

( * ) Notice: Subject to any disclaimer, the term of this patent is extended or adjusted under 35 U.S.C. 154(b) by 0 days.

(21) Appl. No.: 17/907,821

(22) PCT Filed: Feb. 27, 2021

(86) PCT No.: PCT/CZ2021/050025
§ 371 (c)(1),
(2) Date: Aug. 29, 2022

(87) PCT Pub. No.: WO2021/170160
PCT Pub. Date: Sep. 2, 2021

(65) Prior Publication Data
US 2023/0124706 A1    Apr. 20, 2023

(51) Int. Cl.
*B32B 5/02* (2006.01)
*B32B 7/022* (2019.01)
(Continued)

(52) U.S. Cl.
CPC ............. *B32B 5/022* (2013.01); *B32B 7/022* (2019.01); *B32B 7/027* (2019.01); *B32B 7/05* (2019.01);
(Continued)

(58) Field of Classification Search
CPC ........... B32B 5/022; B32B 7/05; B32B 37/04; B32B 37/06; B32B 7/022; B32B 7/027; B32B 37/0084; B32B 38/0036
(Continued)

(56) References Cited

U.S. PATENT DOCUMENTS

| | | | | |
|---|---|---|---|---|
| 2013/0012899 A1* | 1/2013 | Fenske | ................... | B32B 5/022 |
| | | | | 156/187 |
| 2014/0127459 A1* | 5/2014 | Xu | ....................... | D04H 1/4374 |
| | | | | 428/141 |

(Continued)

FOREIGN PATENT DOCUMENTS

| | | |
|---|---|---|
| EP | 0153790 B1 | 5/1991 |
| EP | 3054042 A1 | 8/2016 |

(Continued)

OTHER PUBLICATIONS

International Search Report and Written Opinion Issued to PCT/CZ2021/050025, dated Jun. 4, 2021.
(Continued)

*Primary Examiner* — Tahseen Khan
(74) *Attorney, Agent, or Firm* — Amster, Rothstein & Ebenstein LLP

(57) ABSTRACT

Layered nonwoven textile containing
a first layer (T) of filaments, which contains endless filaments containing a first carrier polymer (A1) and a first binding polymer (B1), which forms at least a part of surface of said endless filaments and which has a melting temperature at least 5° C. lower than the first
(Continued)

Figure 1:

carrier polymer (A1), wherein the first layer (T) of filaments contains bonding points in a spaced arrangement, wherein the bonding points interconnect the filaments and are formed by the first binding polymer (B1), a second layer (M) of filaments, which contains filaments containing a carrier material, the stiffness of which is lower than the stiffness of the first carrier polymer (A1), and a second binding polymer (B2), which has a melting temperature at least 5° C., preferably at least 10° C., lower than the carrier material and the first carrier polymer (A1), wherein the second layer (M) of filaments contains bonding points in a spaced arrangement, wherein the bonding points interconnect the filaments of the second layer (M) and are formed by the second binding polymer (B1).

20 Claims, 7 Drawing Sheets

(51) Int. Cl.
*B32B 7/027* (2019.01)
*B32B 7/05* (2019.01)
*B32B 37/00* (2006.01)
*B32B 37/04* (2006.01)
*B32B 37/06* (2006.01)
*B32B 38/00* (2006.01)

(52) U.S. Cl.
CPC .......... *B32B 37/0084* (2013.01); *B32B 37/04* (2013.01); *B32B 37/06* (2013.01); *B32B 38/0036* (2013.01); *B32B 2250/02* (2013.01); *B32B 2250/20* (2013.01); *B32B 2250/24* (2013.01); *B32B 2305/20* (2013.01); *B32B 2307/54* (2013.01); *B32B 2307/546* (2013.01); *B32B 2310/0454* (2013.01); *B32B 2323/04* (2013.01); *B32B 2367/00* (2013.01); *B32B 2377/00* (2013.01)

(58) Field of Classification Search
USPC ........................................................ 428/220
See application file for complete search history.

(56) References Cited

U.S. PATENT DOCUMENTS

2017/0203539 A1* 7/2017 Sommer .................. B32B 7/05
2019/0021916 A1* 1/2019 Ishikawa ............ B29C 65/4815

FOREIGN PATENT DOCUMENTS

| EP | 3192910 A1 | 7/2017 |
| WO | 2017190717 A1 | 11/2017 |
| WO | 2018059610 A1 | 4/2018 |

OTHER PUBLICATIONS

"Fiber Crimp Distribution in Nonwoven Structure" authored by Kunal Singh, Mrinal Singh and published in 2013 (available at the address) http://article.sapub.org/10.5923.j.fs.20130301.03.html, internet.

* cited by examiner

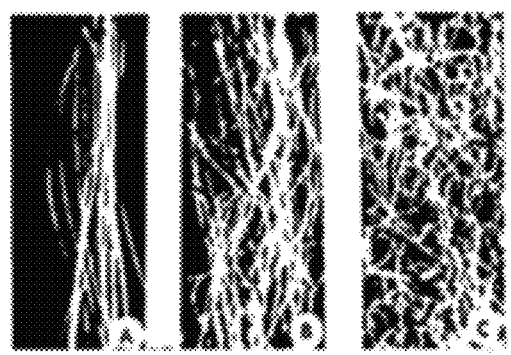
Rayon filaments micrographs (7,8X); A = no crimping, B = medium crimping (5,8 crimps/cm), C = large crimping (7,6 crimps/cm)
Fig. 6
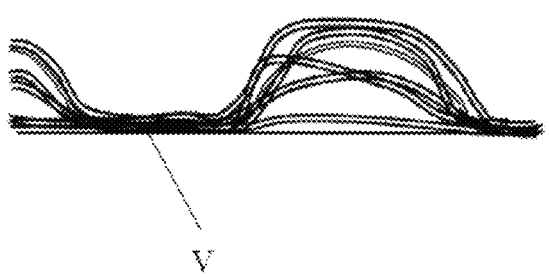
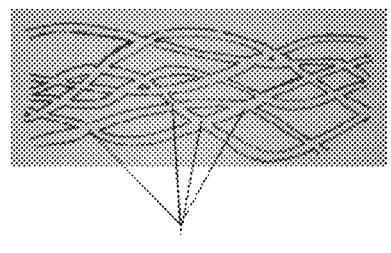
Fig. 7A  Fig. 7B

LAYERED NONWOVEN TEXTILE AND METHOD OF FORMING THE SAME

I. FIELD OF THE INVENTION

The present invention relates to layered nonwoven textiles, and in particular to layered nonwoven textiles having at least two layers of filaments and method of forming the same bond bond bond bond.

II. BACKGROUND ART

It is possible to achieve bulkiness in a nonwoven textile using several known methods—namely by means of selecting suitable polymers, modification of the filament shape (e.g., using various methods of crimped or curled filaments) and by the bonding method—whether thermal (e.g. calender with a suitable emboss pattern, air-laying, ultrasound bonding, etc.), mechanically (e.g. by water-laying, needlepunching, etc.) or by combining several bonding methods together.

It generally applies that the bulkier the material, the "more open" is its structure and the more advantageous bonding methods are those that do not compress the material. For example, bonding with calender rollers generally creates bonding emboss points that are substantially thinner than the areas surrounding them (see for example patent application WO2017190717, or older WO2017190717). From this perspective, it is, for example, more advantageous to bond using hot air, during which no compression occurs.

The openness of a structure is understood to be primarily the presence of free space between filaments, denoted by the terms "porosity" or "void volume". The greater the proportion of free space between the filaments, the greater is the importance of the stiffness of the individual filaments. If the filaments are too flexible, the structure of the filaments will not hold, the filaments will bend and the entire structure will collapse—the thickness of the textile will thus be smaller than it could be. This is observable particularly in polyolefin-based filaments. The problem is resolved namely by the use of stiffer polymers (for example polyester), which is sufficiently stiff that it is able to maintain even a very open textile structure and additionally provides (particularly on air-laid materials) an advantage of the ability to recover after compression to its original bulkiness (i.e. recovery)—see for example PCT Publication No. WO2018059610 describing the utilisation of crimped filaments with a so-called crimp-supporting cross-section (e.g. eccentric core/sheath).

Although the stiffer, less flexible filaments enable the creation of a bulkier structure that is able to recover its initial bulkiness after being compressed, their stiffness and lower flexibility of filaments negatively impacts the overall softness, flexibility and drapeability of the nonwoven textile, which are key characteristics particularly for applications where the textile is close to or in direct contact with the body of the user (for example absorptive hygiene products).

Efforts to resolve this issue by means of layering filaments with various properties are well-known. Unlike carded nonwoven textiles, the standard production lines for spunmelt nonwoven textiles do not enable direct blending of filaments from a single spinning beam. The individual filament layers placed on top of each other need to be subsequently bonded together, which results in the combination of filaments with the same polymer base—see for example the joint patent application of Reifenhauser and Fibertex Personal Care EP2015153790 describing the combination of polyolefin-based layers with various degrees of crimping.

Another effort aimed at achieving bulkiness that is well-known in the art involves, for example, utilising the different behaviours of drawn filaments when activated using hot air by means of a produced layer with a known contractibility (for example PET/PE-type bi-component filaments), which is bonded through bonding points using a calender roller with a layer having a lower contractibility or no contractibility (e.g. PP/PE). The structure is subsequently activated by means of thermal flow (e.g. hot air), the contractible layer contracts and forces the non-contractible layer to arch out into "cushions" between the bonding impressions—see for example patent application EP3192910 submitted by Reifenhauser GmbH & Co. KG Maschinenfabrik.

III. SUMMARY OF THE INVENTION

The disadvantages and deficiencies of the existing state of the art are to a significant degree eliminated by a layered nonwoven textile that contains a first layer of filaments, which contains endless filaments containing the first carrier polymer and the first bonding polymer, which forms at least a part of the surface of these endless filaments and which has a melting temperature at least 5° C. lower than the first carrier polymer, whilst the first layer of filaments contains bonding points in a spaced arrangement, where the bonding points interconnect the filaments and are comprised of the first bonding polymer, a second layer of filaments, comprised of filaments containing the carrier material, the stiffness of which (generally tensile and/or flexural stiffness) is lower than the first carrier polymer, and a second bonding polymer that has a melting temperature at least 5° C., or better yet at least 10° C., lower than the carrier material and the first carrier polymer, whilst the second layer of filaments contains bonding points in a spaced arrangement, where the bonding points interconnect the filaments and are comprised of the second bonding polymer.

The nonwoven textile according to the invention is without bonding emboss points.

Preferably the median spacing distance between adjacent bonding points in the first layer of filaments is less than or equal to 8 mm, and/or the median spacing distance between adjacent bonding points in the second layer is less than or equal to 8 mm.

Likewise, with advantage the carrier material of the filaments in the second layer of filaments is a second carrier polymer the tensile or flexural strength of which is at least 100 MPa lower than of the first carrier polymer, while the second bonding polymer forms at least a part of the surface of these filaments and these filaments of the second layer are endless filaments.

With advantage, the melting temperatures of the first bonding polymer and the second bonding polymer differ by 0 to 5° C., or the first bonding polymer is the same as the second bonding polymer.

Preferably the first carrier polymer and/or second carrier polymer are selected from a group comprising of polyolefins, polyesters, polyamides and their copolymers, and/or the first bonding polymer and/or second bonding polymer are selected from a group comprising of polyolefins, polyesters, polyamides and their copolymers.

With advantage the first carrier polymer forms at least 55% by weight of the filaments in the first layer and/or the second carrier polymer forms less than 55% by weight of the filaments in the second layer (M).

In a particularly advantageous configuration, the ratio of the weighted average density of the polymers in the endless filaments of the first layer to the weighted average density of the polymers in the endless filaments of the second layer is 1.0 to 1.5, preferably 1.1 to 1.3 and/or the ratio of the basis weight of the first layer to the basis weight of the second layer is 1.0 to 1.5, preferably 1.1 to 1.3.

The deficiencies of the existing state of technology are to a significant degree eliminated, likewise, by the production method of a layered nonwoven textile, which includes the following steps:

a) the first carrier polymer and the first bonding polymer are melted, with the first bonding polymer having a melting temperature of at least 5° C. lower than the first carrier polymer, and then fed into the spinnerets of the first spinning beam, whereby endless filaments are formed that have at least a part of their surface comprising of the first bonding polymer, whereupon such formed filaments are cooled and drawn out and subsequently deposited on a running belt, which creates the first layer of filaments, b) the second layer of filaments containing the carrier material, the stiffness of which is lower than the first layer of filaments, is deposited on to the first layer of filaments; and the second bonding polymer has a melting temperature at least 5° C. or better yet at least 10° C. lower than the carrier material and the first carrier polymer, c) whereupon by the effect of air heated to 100° C. to 250° C., preferably to 120° C. to 220° C., better yet to 90° C. to 140° C., most preferably to 110° C. to 130° C., the first layer of filaments is consolidated by the creation of bonding points from the first bonding polymer between the filaments, and the second layer of filaments is consolidated by the creation of bonding points from the second bonding polymer.

With advantage in step b) the carrier material is melted, being the second carrier polymer, the flexural and tensile stiffness of which is at least 100 MPa, better yet at least 200 MPa, better yet at least 300 MPa, better yet at least 400 MPa, with advantage at least 500 MPa lower than the stiffness of the first carrier polymer, and the second bonding polymer, and are fed into the spinnerets of the second spinning beam, by means of which endless filaments are formed that have at least a part of their surface comprising of the second bonding polymer, whereupon such formed filaments are cooled and drawn out and subsequently deposited on a running belt together with the first layer of filaments.

Likewise it is advantageous when in step c) heated air acts on the layers (T, M) for a period of 200 to 20,000 ms, preferably of 200 to 15,000 ms, most preferably of 200 to 10,000 ms and/or in step c) heated air is fed through the layers (T, M), and/or in step c) heated air is fed through the layers (T, M) at a speed of 0.2 to 4.0 m/s, preferably in the range 0.4 to 1.8 m/s.

With advantage the method furthermore includes the step of pre-consolidation of layers performed after step b), before step c), where the pre-consolidation of layers is performed by heating the layers to a temperature in the range of 80 to 180° C., preferably 90° C. to 150° C., most preferably 110° C. to 140° C. to partially soften the bonding polymers.

Definitions

The term "layer of filaments" relates to materials in the form of filaments that are in the condition prior to the filaments being bonded together for the purpose of consolidating, which is a procedure that can be performed using various methods, for example creating connections by the effect of passing air, calendering, etc. A "layer of filaments" includes of individual filaments between which a fixed mutual bond is usually not yet formed, this despite that these filaments may be, in certain ways, pre-interconnected/pre-consolidated, whilst this pre-consolidation may take place during the deposition or shortly after the deposition of the filaments, which is performed, respectively has been performed as part of spreading out the layer of filaments. This pre-consolidation, however, still permits a substantial number of the filaments to be freely mobile, which can thus be repositioned. The above mentioned "layer of filaments" may include of one or multiple layers gradually deposited from multiple spinning beams.

The term "filament" is here defined essentially as an endless filament, whilst the term "staple fibre" relates a fibre that is cut to a defined length. The terms "fibre" and "filament" are herein used to confer the same meaning. In the event of a cut fibre, the term "staple fibre" is exclusively used.

The terms "bonds between filaments" or "bonding points" relate to the bonds that usually connect two filaments in a location where these filaments intersect each other or in a location where they come into contact or alternatively where they adjoin each other. By means of bonding points/consolidating bonds it is possible to connect more than two filaments or to connect two parts of the same filament.

Thus the term "bonding point" here represents the connection of two fibres/filaments at the point of contact by the interconnection of their components exhibiting lower melting points. In the bonding point, the formed component of the filament with the higher melting point is not shaped or damaged. Conversely, the term "bonding impression" represents a surface upon which the boss of a calender roller has acted. A bonding impression has a defined area given by the size of the boss on the bonding roller and compared to the adjacent area typically has a smaller thickness. During the bonding process the area of the bonding impression is typically subjected to significant mechanical pressure, which together with temperature may affect the shape of all filament components within the area of the bonding impression.

The term "mono-component filament" or "mono-component fibre" relates to a filament formed from a single polymer or from a single polymer blend, whereby it is differentiated from a bi-component filament or multi-component filament.

The term "multi-component fibre or multi-component filament" designates a fibre or filament the cross-section of which incorporates more than one individual partial component, whilst each of these independent components in the cross-section includes of a different polymeric compound or a different blend of polymeric compounds. The term "multi-component fibre/multi-component filament" is thus a superior term, that includes, but is not limited to "bi-component fibre/bi-component filament". The different components of multi-component filaments are arranged essentially in clearly defined areas arranged along the cross-section of the filament and extend out continuously along the length of the filament. A multi-component filament may have a cross-section divided into several partial cross-sections including of various components of arbitrary shapes or arrangements, including for example in a coaxial arrangement of the partial components of the cross-section in an arbitrary mutual arrangement of partial components of the cross-section in the form of core and sheath, radial or so-called islands-in-the-sea, etc.

The terms "two-component" and "bi-component" used to describe filaments are herein used interchangeably.

The measurement "filament diameter" is expressed in units of m. The terms "number of grams of filament per 9000 m" (also denier or den) or "number of grams of filament per 10000 m" (dTex) are used to express the degree of fineness or coarseness of a filament as they relate to the filament diameter (a circular filament cross-section is assumed) multiplied by the density of the material or materials used.

"Machine direction" (MD)—in relation to the production of nonwoven fibrous material and the actual nonwoven fibrous material itself, the term "machine direction" (MD) represents the direction that essentially corresponds to the forward motion direction of the nonwoven fibrous material on the production line on which this material is produced.

"Cross direction" (CD)—in relation to the production of nonwoven fibrous material and the actual nonwoven fibrous material itself, the term "cross direction" (CD) represents the direction that is essentially transversal to the forward motion direction of the nonwoven fibrous material on the production line on which this material is produced, whilst located on the plane of the nonwoven fibrous material.

"Nonwoven material" or "nonwoven textile" is a belt or fibrous formation produced from directionally or randomly oriented filaments that are first formed during the creation of a layer of filaments and then consolidated together by means of friction or elicitation of cohesive or adhesive forces and finally consolidated by the creation of mutual bonds, whilst this consolidation is accomplished thermally (e.g. by the effect of flowing air, calendering, effect of ultrasound, etc.), chemically (e.g. using an adhesive), mechanically (e.g. hydroentanglement, etc.), or alternatively by a combination of these methods. The term does not refer to fabrics formed by weaving or knitting or fabrics using yarns or fibres to form bonding stitches. The fibres may be of natural or synthetic origin and may be staple yarns, continuous fibres or fibres produced directly at the processing location. Commercially available fibres have a diameter ranging from less than approximately 0.001 mm to more than approximately 0.2 mm and are supplied in various forms: short fibres (known as staple or cut fibres), continuous individual fibres (filaments or mono-filament fibres), non-twisted bundles of filaments (combed fibres) and twisted bundles of filaments (yarns). A nonwoven textile can be produced using many methods, including technologies such as meltblown, spun-bond, spunmelt, spinning using solvents, electrostatic spinning, carding, film fibrillation, fibrillation, air-laying, dry-laying, wet-laying with staple fibres and various combinations of these processes as known in the art. The basis weight of nonwoven textiles is usually expressed in grams per square metre (g/m2).

In the sense used herein, the term "layer" relates to the partial component or element of a textile. A "layer" may be in the form of multiple filaments produced on a single spinning beam or on two or more consecutively arranged spinning beams, which create essentially the same filaments. For example, two consecutively arranged spinning beams intended for performing the spunbond procedure, have essentially the same settings and process polymers of essentially the same composition, can combine to produce a single layer.

Conversely, two spunbond-type spinning beams of which one produces, for example, single-component filaments and the other produces, for example, bi-component filaments, will form two different layers. The composition of a layer can be ascertained on the basis of knowledge of the individual settings and components determining the resin (polymer) composition used for the creation of the layer or by means of analysis of the nonwoven textile itself, for example, by using electron microscopy, or alternatively by analysis of the composition used in the production of the filaments contained in the layer using the DSC or NMR methods. Adjacent layers of filaments do not necessarily have to be strictly separated, the layers in the border region may blend in together as a result of the filaments of a later deposited layer falling into the gaps between the filaments of an earlier deposited layer.

The "spunbond" process is a nonwoven textile production process, which includes a direct conversion of polymers to filaments, which is directly followed by the deposition of such created filaments, thereby creating a layer of nonwoven filaments containing randomly arranged filaments. This nonwoven layer of filaments is subsequently consolidated in such a way as to enclose the nonwoven textile by the creation of bonds between the filaments. The consolidation process can be performed using various methods, for example by the effect for passing air, calendering, etc.

"Activation" is understood to be the process by which fibres, filaments or fibrous structures that are in semi-stable states (for example in a the lowest possible energy state without an occurring crystallisation), are heated up and then slowly cooled so that the described semi-stable state changes to a different, more stable state (for example a state corresponding to a different crystallisation phase). In the event that the new state assumes a different volume than the original state, namely if it assumes a smaller volume, then we define this as "contraction" or "shrinkage".

The term "cross-section enabling formation by crimping" here relates to multi-component filaments including of components with different characteristics arranged across the cross-section in such a way that during their production or when subsequently heated up to or above the activation temperature and subsequently slowly cooled to achieve the crimping of filaments, during which these filaments follow the vectors of forces causing shrinkage. The release of the filament creates so-called helical crimping, in spite of the fact that the filaments contained inside the fibrous layer are prevented from creating ideal helices due to the mutual adhesion between these filaments. On multi-component filaments it is possible to determine the centre of gravity for each individual component in the cross-section of the filament (on the basis of weighing the surfaces/positions of these components in a given cross-section—see FIG. 5). Irrespective of the theoretical grounds, we presume that if the centre of gravity of all surfaces of each of the components is located essentially in the same point, then it is not possible to achieve crimping on the filament by heating it to the activation temperature. For example, on bi-component filaments with a circular cross-section, where one of the polymeric components forms the core and the other the sheath and both are relatively to each other concentric, the centre of gravity of both components lies in the centre of the cross-section.

The term "compressibility" here relates to the distance in millimetres by which a nonwoven textile is compressed by the effect of a load defined during the measurement of "elasticity".

The term "recovery" here relates to the ability of the textile to recover its initial shape after being compressed. This concerns primarily the ability of regeneration (recovery) of bulkiness based on the ratio between the thickness of the textile after release of the acting load and the initial thickness of this textile.

IV. BRIEF DESCRIPTION OF DRAWINGS

Figure 3:
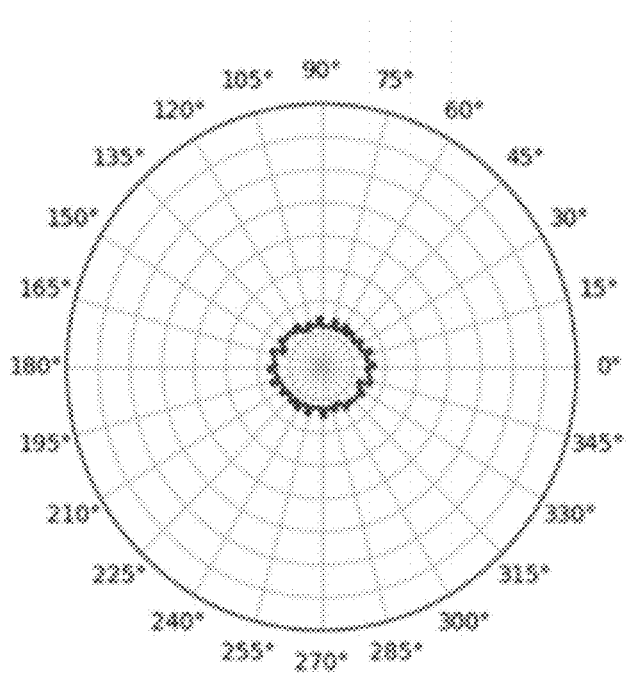
Figure 4:
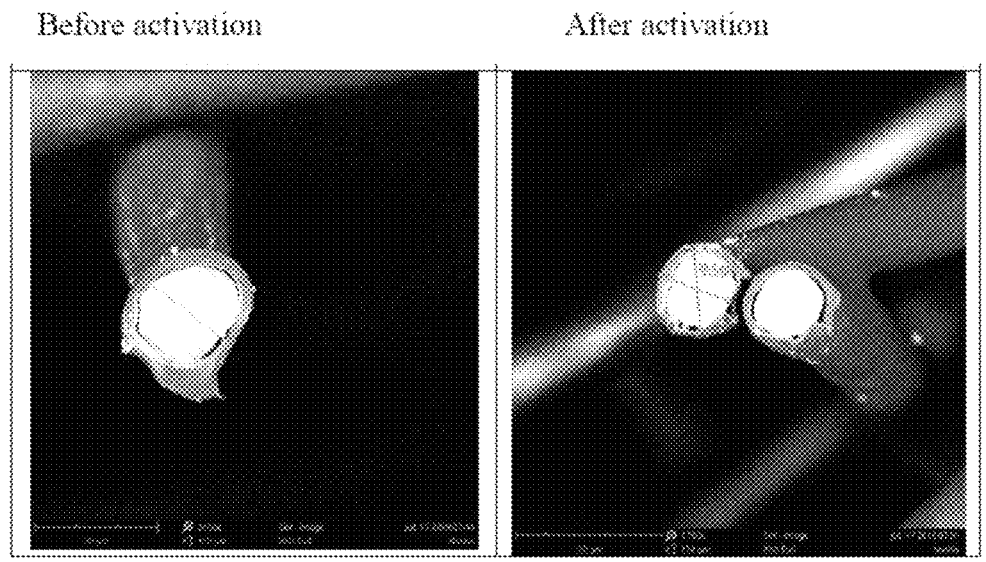
Figure 9:
Figure 10:
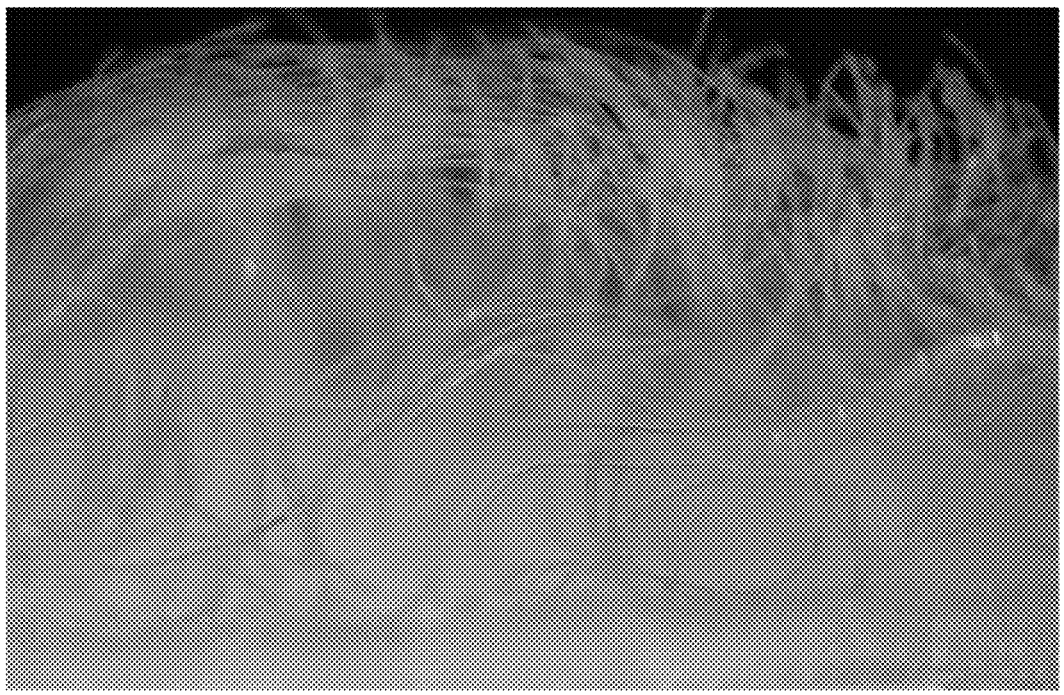
Figure 11:
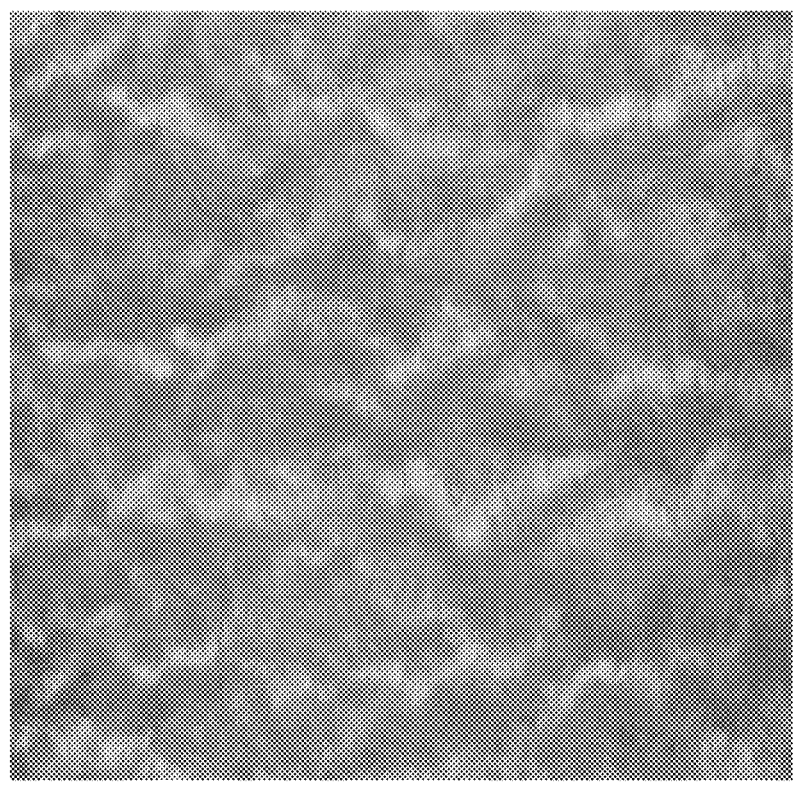
Figure 12:
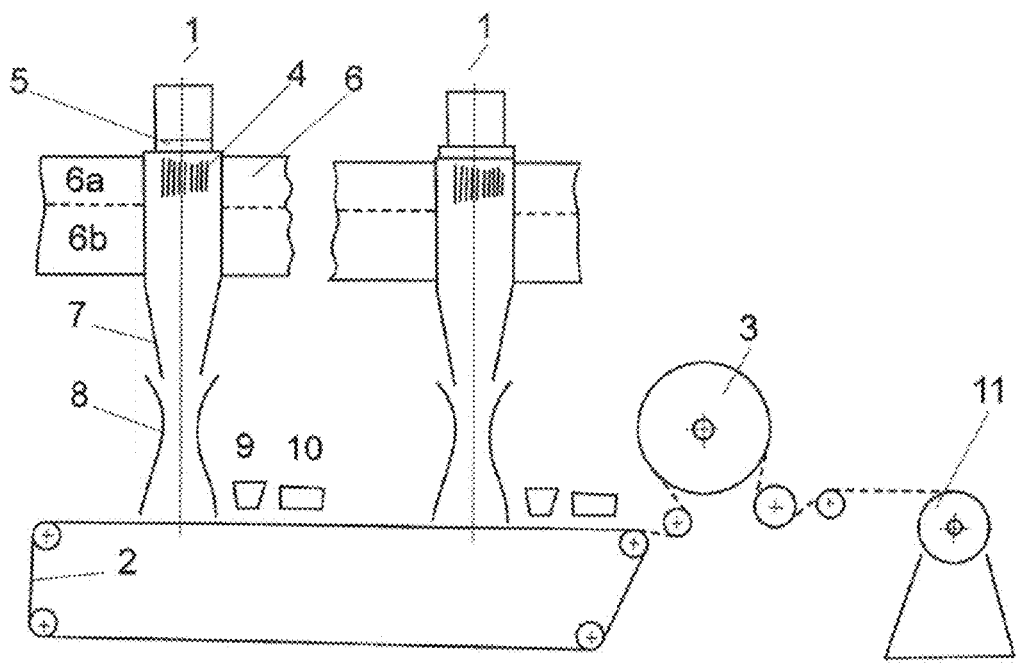
Figure 13:
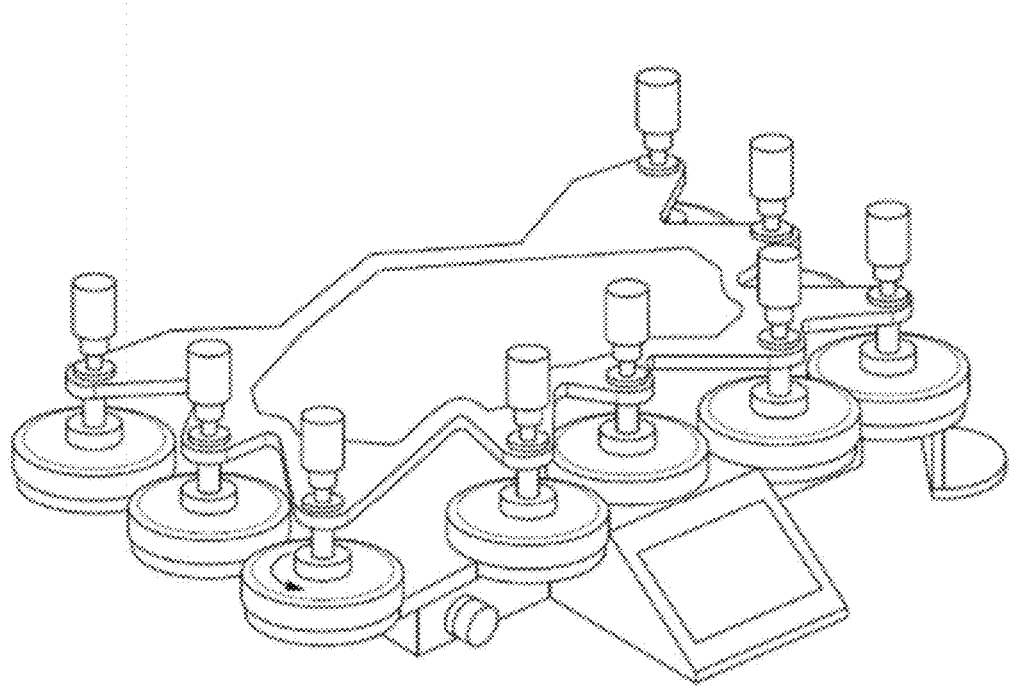
Figure 14:
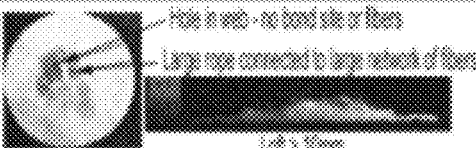

The preferred forms of embodiments of the invention will hereinafter be described in greater detail with reference to the attached schematic drawings, which show FIG. 1. examples of external shapes of filament cross-sections FIG. 2. examples of cross-sections that do not support the crimping of filaments FIG. 3. graph showing the orientation of the directional arrangement of filaments at the plane of the layer according exemplary embodiments of the invention FIG. 4. photograph of filament cuts before and after activation FIG. 5. examples of cross-sections that support the crimping of filaments FIG. 6. comparison of filament micrographs with various levels of crimping FIG. 7A,B: comparison of cross-sections of textiles bonded using an emboss and a textile bonded using bonding points FIG. 8. cross-section example of second layer M FIG. 9. cross-section example of another second layer M FIG. 10. cross-section example of another second layer M FIG. 11. top-down view of the second layer M FIG. 12. schematic description of the production line FIG. 13: perspective view of a device for Martindale Average Abrasion Resistance Grade Test FIG. 14: grading scale for evaluation of Martindale Average Abrasion Resistance Grade Test

V. EXAMPLES OF IMPLEMENTATION OF THE INVENTION

The subject matter of the invention is a thermally bonded nonwoven textile made from endless spunmelt-type filaments containing at least a first layer of filaments (T) and a second layer of filaments (M).

The first layer of filaments (T) contains primarily endless bi-component or multi-component filaments containing a polymer with a higher stiffness, whilst at least one of the components of the filament is comprised predominantly of the first carrier polymer A1 with a higher stiffness and at least one of the other components that is present at least on a part of the surface of the filament, comprising predominantly of the first bonding polymer B1 with a lower melting temperature than the first carrier polymer A1. Without being bound by theory, it is believed that filaments containing a polymer with a higher stiffness provide the nonwoven textile, according to the invention, with bulkiness and recovery. For the solution according to the invention it may be advantageous, when the first layer of filaments T contains spunbond-type endless filaments.

The second layer of filaments (M) contains primarily endless bi- or multi-component filaments containing a polymer with a lower stiffness, whilst at least one of its components is comprised primarily of the second carrier polymer A2 with a lower stiffness than the first carrier polymer A1 and at least one of the other components that is present on a part of the surface of the filament includes primarily of the second bonding polymer B2 that has a lower melting temperature than the second carrier polymer A2 and which is compatible with the first bonding polymer B1 from the first layer of filaments T. Without being bound by theory, it is be believed that filaments containing a polymer with a lower stiffness provide the nonwoven textile, according to the invention, with greater softness, extensibility and improve the touch and feel properties of the textile. For the solution according to the invention it may be advantageous, when the second layer of filaments M contains spunbond-type endless filaments.

Alternatively, the second layer of filaments (M) may include, for example, of natural fibres with a lower stiffness combined with the bonding element comprising of polymer B2 (bonding filaments, powder, etc.). In such a case the force necessary for the bending of a single natural fibre is compared with the force necessary for the bending of a single fiber of the same fineness (denier) and circular cross-section created from polymer A1. For the solution according to the invention, it is advantageous if this ratio is greater than 1:1.1, better yet greater than 1:1.2, with advantage greater than 1:1.5.

Compatibility of polymers B1 and B2 is defined as the same or similar melting point and the ability to combine very well together and create strong and stable blends (mixtures). A person skilled in the field will understand that polymers have specific behaviours. When heated, initially the softening temperature is exceeded, where the polymer starts to soften and is able, under hot air bonding conditions, to bond filaments, and subsequently the melting temperature is reached, where the polymer transitions entirely into the liquid phase, which in terms of thermal bonding is undesirable since an entirely liquid polymer can freely move through the structure, drip, create undesirable clusters, etc. In terms of the invention it is desirable for polymers B1 and B2 to exhibit a common range in their intervals (softening temperature, melting temperature). Generally it can be assumed that well blendable polymers with a melting temperature difference no greater than 10° C., with advantage no greater than 5° C. shall be suitable for use according to the invention. It is advantageous to use as polymer B1 the same polymer as polymer B2.

The bonding polymers B1 and B2 may form part of a blend with another polymer and/or various additives (for example colour pigments, additives supporting the mutual compatibility of polymers, functional additives, additives altering the surface properties of polymers, etc.) may be blended into them. Blending polymers B1 and B2 may include clean new polymers; may include a blend of clean polymers and recycled polymer material; or may include purely recycled material.

The first carrier polymer A1 with a higher stiffness (than A2) is a thermoplastic polymer suitable for processing on a spunmelt production line belonging, with advantage, to the polymer groups of polyolefins, polyesters, polyamides or copolymers of these groups. An advantageous solution represents, for example polypropylene (PP), polyethylene terephthalate (PET), polylactic acid (PLA) and others.

The second carrier polymer A2 with a lower stiffness (than A1) is a thermoplastic polymer suitable for processing on a spunmelt production line belonging, with advantage, to the polymer groups of polyolefins, polyesters, polyamides or copolymers of these groups. An advantageous solution represents, for example polypropylene (PP), polyethylene terephthalate (PET), polylactic acid (PLA) and others.

Carrier polymers A1 and A2 may include clean new polymers; may include a blend of clean polymers and recycled polymer material; or may include purely recycled material.

The stiffness of polymers can be expressed, for example, using the modulus of flexural elasticity (flexural modulus) or the modulus of tensile elasticity (Young's modulus), which are mutually significantly correlated. Both moduli can be specified for both a specific polymer as well as a blend of polymers and it is thus possible to express the stiffness of the polymers and the stiffness of an element of the filament or the stiffness of the polymeric combination representing the entire filament.

For example, the average flexural moduli for the selected polymers are presented in the following table:

| polymer | Modulus of flexural elasticity (Flexural modulus) | Modulus of tensile elasticity (Young's modulus) |
| --- | --- | --- |
| Polyethylene (LDPE) | 100-780 MPa | 135-860 MPa |
| Polypropylene (PP) | 900-1700 MPa | 1200-2000 MPa |
| Polylactic acid (PLA) | 215-1830 MPa | 350-2800 MPa |
| Polyethylene terephthalate (PET) | 1900-3310 MPa | 2000-3800 MPa |

For the solution according to the invention it is advantageous, when the difference between the stiffness of the first carrier polymer A1 and the stiffness of the second carrier polymer A2 as expressed by the tensile elasticity modulus (Young's modulus) is at least 100 MPa, better yet at least 200 MPa, better yet at least 300 MPa, better yet at least 400 MPa, with advantage at least 500 MPa.

For the solution according to the invention it is advantageous, when the difference between the stiffness of the first carrier polymer A1 and the stiffness of the second carrier polymer A2 as expressed by the flexural elasticity modulus (flexural modulus) is at least 100 MPa, better yet at least 200 MPa, better yet at least 300 MPa, better yet at least 400 MPa, with advantage at least 500 MPa.

The tensile elasticity modulus and the flexural elasticity modulus need to be specified for each specific polymer individually. The flexural elasticity modulus using norm ISO 178:2010 and the tensile elasticity modulus using norm ČSN EN ISO 527-1 (640604).

The bonding polymers B1 and B2 with a lower melting temperature (than A1 and A2) are thermoplastic polymers suitable for processing on a spunmelt production line belonging with advantage to the polymer groups of polyolefins, polyesters, polyamides or copolymers of these groups. A suitable solution is presented, for example by polyethylene (PE), polypropylene (PP), polyethylene terephtalate (PET), polylactic acid (PLA), nylon and primarily so-called low-melting copolymers of the above specified groups (for example copolymer PP/PE, copolymer PET, copolymer PLA, etc.).

For example, a bi-component filament contains two elements arranged within the cross-section of the filament. For example a core-sheath (C/S) type of bi-component filament contains two elements, where one represents the core of the filament and the other wraps around it and forms the surface of the filament. The carrier polymer A with a defined stiffness is used here with advantage for the core, where it can form the core directly, or represents one of the input raw materials of a blend forming the core of the filament.

Bonding polymer B with a lower melting point forms the sheath, or represents one of the input raw materials of a blend forming the sheath of the filament. Likewise, it is possible to describe side-by-side (S/S) type, eccentric core-sheath (eC/S) type bi-component filaments, etc.

For the solution according to the invention it is advantageous when the first component of a bi-component filament (e.g. core, side) has in the first layer T a higher stiffness than in the second layer M. For the solution according to the invention it is advantageous when the difference between the stiffness of the first component of the bi-component filament in the first layer T and the stiffness of the first component of the bi-component filament in the second layer M as expressed by the tensile elasticity modulus (Young's modulus) is at least 100 MPa, better yet at least 200 MPa, better yet at least 300 MPa, better yet at least 400 MPa, with advantage at least 500 MPa.

For the solution according to the invention it is advantageous, when the difference between the stiffness of the first bi-component component of the filament in the first layer T and the stiffness of the first bi-component component of the filament in the second layer M as expressed by the flexural elasticity modulus (flexural modulus) is at least 100 MPa, better yet at least 200 MPa, better yet at least 300 MPa, better yet at least 400 MPa, with advantage at least 500 MPa.

Without being bound by an exhaustive list, several examples of material compositions according to the invention are presented below:

The solution according to the invention may, for example, contain a first layer T that includes endless core/sheath (C/S) type filaments where the core is made from PET (=A1) and the sheath from PE (=B1) and a second layer M that includes endless core/sheath (C/S) type filaments, where the core includes PP (=A2) and the sheath includes PE (=B2). The stiffness of polymers A1 and A2 as expressed by the flexural elasticity modulus differs by more than 500 MPa, polymers B1 and B2 are the same (PE) and their melting point is lower than the melting point of polymers A1 and A2.

The solution according to the invention may, for example, contain a first layer T that includes endless core/sheath (C/S) type filaments where the core is made from PLA (=A1) and the sheath from PE (=B1) and a second layer M that includes endless eccentric core/sheath (eC/S) type filaments, where the core includes PP (=A2) and the sheath includes PE (=B2). The stiffness of polymers A1 and A2 as expressed by the flexural elasticity modulus differs by more than 200 MPa, polymers B1 and B2 are the same (PE) and their melting point is lower than the melting point of polymers A1 and A2. Filaments in layer M will most probably exhibit a tendency to crimp or to spontaneously crimp (latent crimping or self-crimping). The solution according to the invention may, for example, contain a first layer T that includes endless core/sheath (C/S) type filaments where the core is made from PET (=A1) and the sheath from CoPLA (=B1) and a second layer M includes endless side/side (S/S) type filaments, where one side includes PLA (=A2) and the other includes CoPLA (=B2). The stiffness of polymers A1 and A2 as expressed by the flexural elasticity modulus differs by more than 100 MPa, polymers B1 and B2 are the same (coPLA) and their melting point is lower than the melting point of polymers A1 and A2. Filaments in layer M will probably exhibit a tendency to crimp or to spontaneously crimp (latent crimping or self-crimping). The solution according to the invention may, for example, contain a first layer T that includes endless eccentric core/sheath (eC/S) type filaments where the core is made from PET (=A1) and the sheath from PP1 (=B1) and a second layer M includes endless core/sheath (C/S) type filaments, where the core includes PP2 (=A2) and the sheath includes PP3 (=B2). The stiffness of polymers A1 and A2 as expressed by the flexural elasticity modulus differs by more than 200 MPa, polymers B1 and B2 are compatible (PP1 and PP3) and their melting point is lower than the melting point of polymers A1 and A2. Filaments in layer T will most probably exhibit a tendency to crimp or to spontaneously crimp (latent crimping or self-crimping).

The solution according to the invention may, for example, contain a first layer T includes endless eccentric core/sheath (eC/S) type filaments, where the core is made from PET (=A1) and the sheath from coPET (=B1) and a second layer M includes endless eccentric core/sheath (C/S) type filaments, where the core includes PLA (=A2) and the sheath includes coPET (=B2). The stiffness of polymers A1 and A2 as expressed by the flexural elasticity modulus differs by more than 100 MPa, polymers B1 and B2 are the same (coPET) and their melting point is lower than the melting point of polymers A1 and A2. Filaments in both layers T and M will most probably exhibit a tendency to crimp or to spontaneously crimp (latent crimping or self-crimping).

The solution according to the invention may, for example, contain a first layer T that includes endless side/side (S/S) type filaments where the one side is made from PET (=A1) and the other side from coPET (=B1) and a second layer M that includes endless side/side (S/S) type filaments, where one side includes PLA (=A2) and the other includes coPET (=B2). The stiffness of polymers A1 and A2 as expressed by the flexural elasticity modulus differs by more than 100 MPa, polymers B1 and B2 are the same (coPET) and their melting point is lower than the melting point of polymers A1 and A2. Filaments in both layers T and M will most probably exhibit a tendency to crimp or to spontaneously crimp (latent crimping or self-crimping).

The solution according to the invention may, for example, contain a first layer T that includes endless eccentric core/sheath (eC/S) type filaments, where the core is made from PET (=A1) and the sheath from PE (=B1) and a second layer M that includes short crimped cellulose fibres for air-laid application in a blend with powder PE. The ratio of forces necessary to bend a single filament is greater than 1.5.

The solution according to the invention can contain e.g. a first layer (T), comprised of endless filaments of the core/sheath (eC/S) type, wherein the core is made of PP1 (=A1) and the sheath of PE (=B1), and a second layer (M), comprised of endless filaments of the core/sheath (eC/S) type, wherein the core is made of PP2 (=A2) and the sheath of PE (B2).

The stiffness of the polymers A1 and A2, expressed by the flexural elasticity modulus, differs by more than 100 MPA, the polymers B1 and B2 being identical (PE) and their melting point being lower than the melting point of the polymers A1 and A2. Filaments in both layers (T, M) will very likely exhibit a tendency to crimping or will crimp spontaneously (latent crimping or self-crimping).

The solution according to the invention can contain e.g. a first layer (T), comprised of endless filaments of the type core/sheath (eC/S), wherein the core is made of PP (=A1) and the sheath of PE (=B1), and a second layer (M), comprised of endless filaments of the core/sheath (eC/S), wherein the core is made of a blend (=A2) of multiple polymers based on polypropylene with differing properties (without being bound by an exhaustive list, the polymer blend can be made of e.g. a homopolymer and a copolymer of polypropylene, polypropylene with a higher and a lower melt flow rate etc.), and the sheath is made of PE (B2). The stiffness of the polymers A1 and A2, expressed by flexural elasticity modulus, differs by more than 100 MPa, the polymers B1 and B2 being identical (PE) and their melting point being lower than the melting point of the polymers (A1 and A2). The filaments in both layers (T and M) will very likely exhibit a tendency to crimping or will crimp spontaneously (latent crimping or self-crimping).

The stiffness of the filaments can be affected not only by the polymer used but also by, for example, the thickness of the filaments. The terms "thickness of the filaments" and "filament diameter" are in the present application used interchangeably.

In terms of the invention, it can be advantageous when the thickness of the filaments d1 in the first layer (T) is greater than the thickness of the filaments d2 in the second layer (M). For example in an application where the most important factor is the bulkiness of the nonwoven textile combined with the associated requirement of a soft surface on the nonwoven textile.

In terms of the invention, it can be advantageous when the thickness of the filaments d1 in the first layer (T) and d2 in the second layer (M) is the same or very similar, i.e. where d1/d2 is 0.8 to 1.3. For example in applications where the homogeneity of the material on the surface and in cross-section is important.

In terms of the invention, it can be advantageous when the thickness of the filaments d1 in the first layer is smaller than the thickness of the filaments d2 in the second layer. For example in applications where the overall softness and flexibility of the material is important. A person skilled in the art will easily understand which combination of filament thicknesses according to the invention is advantageous for their application.

The stiffness of the filaments can also be affected by the ratio of the polymeric components in the filament. For example, in the case of two filaments of the same diameter d in the arrangement core/sheath, where the core includes polymer A and the sheath includes polymer B, the filament with the lower share of the core component i.e. of polymer A (for example 50%) will have a lower overall stiffness than the filament with a greater share of the core component, i.e. polymer A (for example 30%). Each of the first layer (T) and second layer (M) filaments may be contained in the nonwoven textile once or multiple times.

For example the first layer T may form the base layer and the second layer M may form the surface of the product (e.g. TM, TTM, MTM, MTTM, TMM, TTMM, etc.).

For example the first layer T can, with its open structure, form an entry area, which is narrowed down in the second layer M (e.g. TM, TTM, TMT, TMM, TTTM, etc.).

For example, the layers T and M may alternate, where, for example, the softness of the interlayers M is made finer by the material and masked by the stiffness of the T layers (e.g. MTM, MTMT, MTMTM, TMTMT, etc.).

A nonwoven textile according to the invention can, apart from the first layer T and the second layer M contain also another layer X, under the condition that this layer is thermally bondable with the first and second layer. For example, possible compositions include types TXM, MXT, XMT, XTM, MTXTM, XMTMX, MTXM and many others.

According to the invention, the nonwoven textile may also include multiple pairs of T-M layers. For example, in a nonwoven textile produced on three spinning beams S1-S2-S3, the following can be created: S1 layer T1, S2 layer M1 (against layer T1), which is concurrently layer T2 (against layer M2) and S3 layer M2.

According to exemplary embodiments of the invention, the nonwoven textile is bonded thermally. Energetically advantageous is thermal bonding essentially of the complete volume of the fibrous layers forming the nonwoven textile, where the bonding point may be created at any intersection of the filaments in the structure. During this type of thermal bonding, according to the invention, due to the passage of heat through the layer of filaments, the B polymer in both layers softens and even melts, both on the surface and in the interface between the layers. At the filament contact points, the melted polymer joins and during the subsequent cooling stiffens and connects the touching filaments together. The structure of filaments created in this manner generally exhibits a soft-loft type softness, flexibility and frequently also recovery. A suitable bonding method according to the invention is, for example, bonding using a current of hot air, or particularly for lower basis weights, bonding using infrared radiation.

For example, a bi-component filament contains 2 elements arranged within the cross-section of the filament. For example a core-sheath (C/S) type of bi-component filament contains two elements, where the first represents the core of the filament and the second wraps around it and forms the surface of the filament. The polymer with the lower melting temperature B is used here with advantage for the sheath, where it can form the sheath directly, or represents one of the input raw materials of a blend forming the sheath of the filament. Polymer A with a defined stiffness forms the core or represents one of the input raw materials of a blend forming the sheath of the core. Likewise, it is possible to describe side-by-side (S/S) type, eccentric core-sheath (eC/S) type bi-component filaments, etc. The arrangement of the components of the filament may be known on the basis of the settings used in its production or may be identified using the method "estimation of filament cross-section type".

For the solution according to the invention, it is advantageous if the second component of the bi-component filament (e.g. sheath, side) has a lower melting temperature. For the solution according to the invention, it is advantageous if the difference between the melting temperature of the first and second component of the bi-component filament is at least 5° C., better yet at least 10° C., with advantage at least 15° C.

The melting temperature of polymer B with the lower melting temperature is assessed preferentially against the respective polymer A with a defined stiffness. For example in the first layer the melting temperature of polymer B1 is assessed against the melting temperature of polymer A1. Due to the fact that the first layer T and the second layer M are interconnected by means of polymers B1 and B2, it is necessary to also take into consideration polymer A2 and to thus assess the melting temperature of both polymers B1 and B2 against it. The difference in the melting temperature of polymers A2 and B1, respectively B2 is at least 5° C., better yet at least 10° C., with advantage at least 15° C. Thermal bonding fundamentally affects the resulting properties of the nonwoven textile, which is given by the intensity of the interconnection of the filaments, which is dependent on several values, such as particularly the amount of the bonding polymer in the structure, the amount of heat supplied during the course of bonding and the bonding temperature, density of the filaments in the structure, etc.

For example, a layer of filaments composed of core-sheath type bi-component filaments in the ratio of 80:20 contains a relatively small amount of bonding polymer and the individual bonding points between the filaments will be composed of a small amount of material, which can be separated with a relatively low force. The created structure will most probably be relatively softer (as expressed by, for example, the flexibility and compressibility of the nonwoven textile) due to the effect of the flexing of filaments and the looseness of the bonds and will also be less resistant against rubbing. On the other hand, for example a layer of filaments composed of core-sheath type bi-component filaments in the ratio of 50:50 contains a relatively large amount of bonding polymer and the individual bonding points between the filaments are composed of a large amount of material. A structure created in this way will be relatively stiffer, will exhibit a higher degree of recovery and will be more resistant against rubbing. For example a layer of filaments composed of core-sheath type bi-component filaments in the ratio 20:80 contains a relatively large amount of bonding polymer and the individual bonding points between the filaments will include a very large amount of material interconnected by only exceptionally thin filaments comprising of the original cores of the filaments. A structure formed in this way shall be relatively soft but will most probably be deficient in bulkiness.

For example a layer of filaments bonded at a lower temperature corresponding to the softening of the bonding polymer or a very short exposure at a higher temperature shall contain relatively very weak connections between the filaments, which shall be easy to break. A softer structure with a very poor resistance against abrasion can be expected. On the other hand, for example, a layer of filaments bonded at a higher temperature that exceeds the temperature of the bonding polymer and/or over a long exposure time at a suitable temperature shall contain relatively solid connections between the filaments created by the melting and resetting of all the bonding polymer. A stiffer structure with good recovery and good resistance against abrasion can be expected.

For example, a layer of very fine filaments will contain a large number of bonding points per unit of volume, whilst by contrast a layer of thicker filaments will, at the same basis weight, contain a significantly smaller number of bonding points, however, these filaments shall generally exhibit greater stiffness.

By utilising suitable settings of the aforementioned parameters it is possible to purposefully produce a nonwoven textile exhibiting greater softness, flexibility, stiffness, abrasion resistance, etc.

With materials according to the invention, where two layers of filaments with differing parameters are combined, it is possible to set conditions in such a way so that, for example, one layer is less interconnected and the other layer is more interconnected. For example, at a lower degree of interconnectedness in the first layer T, the stiffness of the layer shall decline relative to the reduction in abrasion resistance whilst retaining the recovery of the layer. If the same bonding conditions provide a higher degree of bonding of the second layer M containing material with a lower stiffness that achieves a relatively good abrasion resistance, whilst retaining a degree of softness given by the polymeric composition and supported by, for example, the fineness of the filaments, the result may be a material according to the invention that combines in itself high softness, abrasion resistance from the application side (second filament layer M) and recovery.

Without being bound by theory, it is believed that the combination of thermal bonding throughout the entire volume of the nonwoven textile (for example hot air bonding) in combination with filaments containing polymer A1 with a higher stiffness is the main reason for the recovery of the layer. The filaments are interconnected in small bonding points found throughout the entire volume of the nonwoven textile and between the individual bonding point there are—depending on the bulkiness of the layer—relatively small sections of filaments pointing in all directions in 3D space. The overall structure is created at a higher temperature (bonding temperature) at which the solid state of polymer A is maintained, but which enables a change in its crystallisation state, which is maintained at a relatively low cooling rate. Namely in the case of compression in the z-direction (thickness of the nonwoven textile), this produced structure has a great tendency to return to its initial state (recovery). It can generally be assumed that the higher the stiffness of polymer A, the greater will be the tendency of the nonwoven textile to return to the original state (recovery). Polymer B with a lower melting temperature will contribute significantly less to recovery, since in the course of the thermal bonding process, unlike polymer A, it will be partially or completely melted (to enable the interconnection of filaments), may change its position and shape (for example during the course of thermal bonding it may relatively concentrate itself in filament contact locations=bonding points and, and conversely its share may decline on the filaments between the bonding points), etc.

The second layer (M) containing polymer A2 with a lower stiffness is, given its presence in the composite, bonded under the same conditions as the first layer (T). Here too, the aforementioned structure of bonding points and relatively short filament sections between them are created. Given the lower stiffness of polymer A2, the tendency towards softness and drapeability of the layer is supported. Namely human perception of the stiffness of the layers may differ from the standard layer stiffness assessment methods (Handle-O-Meter, compressibility, flexibility) and the layer with filaments containing polymer A2 with a lower stiffness is generally subjectively assessed as better in terms of softness than a layer containing filaments with polymer A1 with higher stiffness, even despite the fact that in specific cases, for example, the measurement value of the Handle-O-Meter is the same or even higher.

With surprise it was discovered, that the nonwoven textile produced according to the invention exhibits unique properties. The combination of filaments containing a stiffer polymer and filaments containing a less stiff polymer creates a composite that generally exhibits

- A degree of extensibility generally comparable to a material produced only from filaments of the second layer M (higher than on the material produced from the filaments of the first layer T)
- A degree of recovery generally comparable or exhibiting only a relatively small reduction relative to the material produced from filaments of the first layer T
- A degree of softness expressed by the measurement of compressibility of the nonwoven textile generally comparable or exhibiting only a relatively small reduction relative to the material produced from filaments of the second layer M It may be advantageous for the nonwoven textile according to the invention if the first layer (T) includes thicker filaments (with a thickness above 25 microns, better yet above 30 microns, with advantage above 35 microns, but preferentially no more than 100 microns, better yet no more than 70 microns, with advantage no more than 50 microns) containing a larger share of polymer A1 (for example at least 55 weight % of polymer A1, better yet at least 60 weight % of polymer A1, better yet at least 65 weight % of polymer A1, with advantage at least 70 weight % of polymer A1 of the total weight of the filament) and a lower share of polymer B1 (for example no more than 45 weight %, better yet no more than 40 weight %, better yet no more than 35 weight %, with advantage no more than 30 weight % of polymer B1 of the total weight of the filament). Concurrently, the second layer (M) includes thinner filaments (with a thickness under 30 microns, better yet under 25 microns, with advantage under 20 microns) containing a lower share of polymer A2 (for example no more than 60 weight %, better yet no more than 55 weight %, better yet no more than 50 weight %, with advantage no more than 45 weight % of polymer A2 of the total weight of the filament) and a higher share of polymer B2 (for example more than 40 weight %, better yet more than 45 weight %, with advantage more than 50 weight % of polymer B1 of the total weight of the filament). With surprise it was discovered that a nonwoven textile produced in this way exhibits a high bulkiness and recovery of the first layer (T), whilst the high share of free space in the structure (void volume) together with the lower filament bonding strength (resulting from the lower number of bonding points in the filament contact locations and concurrently the lower volume of the bonding component B1) will support the "soft-loft" type of softness, however at the cost of a "rougher" subjective touch and feel perception. Concurrently, the second layer (M) with thin filaments and a higher share of bonding component B2 will exhibit lower bulkiness, however, when soft polymers are used, will exhibit outstanding touch and feel properties, which can be further supported by, for example, touch and feel improvement additives (e.g. erucamide for a silky touch and feel, specific additives for a so-called cotton touch, etc.). A combination performed in this way delivers a bulky material with a high subjective perception of softness. When touched from the side of the second layer (M), upon initial contact, the skin receives a pleasant perception feeling when the textile is touched, which concurrently softly flexes also under light pressure. At the same time, the certain "roughness" of the first layer (T) is masked by the softness and silkiness of the second layer (M). When pressure is increased, the bulky second layer (T) also starts to gradually become compressed, which presents greater resistance against pressure (expressed, for example, by elasticity measurements). The increase in the required pressure is gradual and also the resistance against compression increases gradually and thus the material is subjectively perceived as pleasantly soft and comfortable. For the nonwoven textile according to the invention, it may be advantageous, if the basis weight of the first layer (T) is higher than the basis weight of the second layer (M). For example, the basis weight ratio of layer T to the basis weight of layer M is advantageous at at least 55:45, better yet at least 60:40, better yet at least 65:35, with advantage at least 70:30, but less the 95:5, better yet less than 95:10, with advantage less than 85:15. For the nonwoven textile according to the invention, it may be advantageous if the ratio of the basis weight of the first layer T produced from one spinneret and the basis weight of the second layer M produced on one spinneret approximately corresponds to the average density of the polymeric composition of the filaments in these layers. This solution is advantageous particularly from the perspective of production costs, where it is possible to utilise the full operating performance of both spinnerets when producing on standard spunbond spinnerets. If on the basis of the ratio of weighted polymer density averages and on the basis of the required total basis weight of the layered nonwoven textile a calculation is performed to determine the recommended basis weight of the individual layers T, M, it is advantageous, when, for example, the basis weight of the first layer T and the second layer M does not differ by more than 5 g/m2 from the calculated value, better yet does not differ by more than 4 g/m2 from the calculated value, better yet does not differ by more than 3 g/m2 from the calculated value, with advantage does not differ by more than 2 g/m2 from the calculated value.

Several examples are provided in the below tables (density in kg/m3, basis weight in g/m2):

| | | | | | | first layer T |
|---|---|---|---|---|---|---|
| option | A1 | density A1 | share of A1 | B1 | density B1 | share of B1 | Weighted polymer density average |

| option | A1 | density A1 | share of A1 | B1 | density B1 | share of B1 | Weighted polymer density average |
|---|---|---|---|---|---|---|---|
| 1 | PET | 1380 | 80% | PE | 918 | 20% | 1288 |
| 2 | PET | 1380 | 50% | PE | 918 | 50% | 1149 |
| 3 | PLA | 1250 | 60% | PE | 918 | 40% | 1117 |
| 4 | PET | 1380 | 70% | PP | 943 | 30% | 1249 |

Second layer M

| option | A2 | density A2 | share of A2 | B2 | density B2 | share of B2 | Weighted polymer density average |
|---|---|---|---|---|---|---|---|
| 1 | PP | 943 | 40% | PE | 918 | 60% | 928 |
| 2 | PP | 943 | 60% | PE | 918 | 40% | 933 |
| 3 | PP | 943 | 50% | PE | 918 | 50% | 931 |
| 4 | coPET | 1360 | 40% | PP* | 935 | 60% | 1105 |

NT with layers TM, total 100 gsm

| option | T/M of the weighted density averages | advantageous gsm of T (calculated value) | advantageous gsm of T (calculated value) | advantageous gwm of T M (recommended interval for +−2 gsm) | advantageous gsm of M (recommended interval for +−2 gsm) |
|---|---|---|---|---|---|
| 1 | 1.39 | 58 | 42 | 56-60 | 40-44 |
| 2 | 1.23 | 55 | 45 | 53-57 | 43-47 |
| 3 | 1.20 | 55 | 45 | 53-57 | 43-47 |
| 4 | 1.13 | 53 | 47 | 51-55 | 45-49 |

A calculation is performed, likewise, also for the case where the nonwoven textile contains more than two layers.

In one of the advantageous solutions according to the invention, the weighted polymer density average in the filaments of the first T layer and the second M layer differs. This density indicates the weight of the polymer per unit of volume. If the difference in values is too large, undesirable effects may result, where the filaments from the composition with significantly higher weighted density average act on the filaments of the layer with a lower weighted average, compressing them non-homogeneously and creating undesirable effects, particularly when the higher weighted polymer density average in the filaments is exhibited by filaments in the M layer. For one of the solutions according to the invention, the ratio of the weighted average density of the polymers in the endless filaments of the first layer (T) to the weighted average density of the polymers in the endless filaments of the second layer (M) is 1.0 to 1.5, preferably 1.1 to 1.3 and/or the ratio of the basis weight of the first layer (T) to the basis weight of the second layer (M) is 1.0 to 1.5, preferably 1.1 to 1.3.

The polymer groups (polyolefins, polyesters) listed above, do not differ only in their stiffness, but also by other differing properties, which can be utilised to support the desired final characteristics of the nonwoven textile. Polyesters (for example PET, PLA or their copolymers) exhibit so called shrinkage. For their proper crystallisation, these polymers generally require a longer time than is available while filaments cool down during the spunmelt production process. Reheating filaments containing these polymers (for example a narrow current of hot air "hot air knife", hot air bonding, infrared radiation) generally results is their recrystallisation, where the new more stable crystallisation state generally takes up a smaller volume that the initial semi-stable crystallisation state=shrinkage.

Shrinkage is generally considered an undesirable event, however if appropriately controlled, may deliver advantages.

For the material according to the invention, it may be advantageous if the first layer T, alternatively both layer M and T contain endless filaments with a cross-section non-supportive of crimping. These may be multi-component, preferentially bi-component. Irrespective of the theoretical grounds, we are convinced that the centre of gravity of cross-sectional surfaces composed of a component arranged across the cross section of the filaments is located essentially in the same position as the centre of gravity of the cross-section of all of the other components, the cross-section of which does not enable the creation of crimping by heating up to the activation temperature.

The layers according to the invention may include, for example, predominantly endless filaments with a round cross-section, three-pointed cross-section and star cross-section, etc. (FIG. 1).

Figure 2:
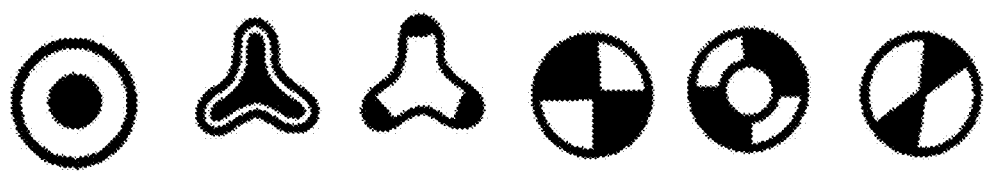

Endless filaments may be, for example, multi-component filaments, whilst the arrangement of the individual components in the cross-section of the filament may be represented by a core and sheath (concentric arrangement), sectors or other arrangements with the centre of gravity of the surfaces of the components in a single location within the cross-section of the endless filament (FIG. 2).

Irrespective of the theoretical grounds, it is believed that the determining element with respect to the creation of filaments having the required characteristics is a specific combination of two components. First and foremost, it is preferable that the filament component from which the nonwoven structure is created, and for example the core of this structure, includes polymer A1, which is able to shrink under specific conditions. During the filament forming process—particularly during the cooling and drawing stages—it is then this polymer A1 that is able to change its state, which is desirable with respect to the future activation phase. Polymer A1 can, for example, initially be in a semi-stable state (for example in a state with the currently lowest possible energy without ongoing crystallisation), whereupon it heats up during the activation phase and then slowly cools down in order to change from the mentioned semi-stable state to another different, more stable state (for example to a state corresponding to the different lower-volume crystallisation phase) This change results in the generation of internal forces causing shrinkage, where we presume that their vector is directed in the direction of the median curve of the filament.

The diameters of the filaments in the nonwoven textile produced using the spunmelt method are in the millimetre and/or submillimetre range, whilst these filaments generally have an omnidirectional orientation (see FIG. 3) and touch each other in a way that free sections between them have a size that is likewise in the millimetre and/or submillimetre range. The mutual cohesion between the filaments acts against the vectors of internal forces and thereby forms the respective first point of resistance. This point of resistance may also be termed as the threshold point of resistance against structural shrinkage. If, for example, one filament is in the correct state and undergoes activation, it may create, for example, an irregular arch or wavy sections extending out in all 3 dimensions. A filament that is constrained by the surrounding circumjacent structure formed by adjacent filaments, by contrast does not have such a degree of freedom.

According to the invention, the layer is formed using bi-component filaments, whilst the second component includes polymer B, which has a lower melting temperature and preferentially also provides other required characteristics such as softness, providing a more pleasant touch and feel property, etc. The polymeric material A1 and polymeric material B1 should have mutually different characteristics related to shrinkage, which means that in the preferred configuration the polymeric material B (which is preferentially the material forming the sheath of the filament) may have a lower contractibility (shrinkage) than polymeric material A (which is preferentially the material forming the core of the filament). The result is the generation of differing forces causing shrinkage, which act inside the two polymeric materials that are in mutual contact. Irrespective of the theoretical grounds, we are convinced that polymeric material A and polymeric material B will always have different characteristics, which means that the vectors of the internal forces causing shrinkage are never equal at the same point in time. This inhomogeneity of forces enables the creation of a second threshold point of resistance against shrinkage. This point of resistance may also be termed as the threshold point of resistance against the shrinkage of filaments.

Irrespective of the theoretical grounds, it is believed that this specified regularity of shift is the main reason for the regularity of the crimping of the free sections of the individual filaments. By contrast, thus in accordance with this invention, likewise irrespective of the theoretical grounds, in the case of filaments that have a cross-section not supporting crimping, the internal vectors of forces causing crimping in the first and second components do not provide the possibility of regular mutual shifting, the result of which is that such a filament creates irregular arches or wavy sections in arbitrary directions. With substantial simplifications it is possible to declare that a filament does not have a regular propensity to bending in the direction of a specific part of its cross-section or perimeter, which results in it irregular final form. After activation, the cross-section of such a filament remains essentially in a state non-supportive of crimping, see FIG. 4.

Irrespective of the theoretical grounds, it is believed that if the internal force causing shrinkage is small, and thus unable to overcome the counter-oriented forces corresponding to the threshold point of the resistance of the filaments, the textile remains unchanged. If, however, the internal forces causing shrinkage are sufficiently large and thus able to overcome all the directed forces corresponding to the threshold points of resistance in the MD/CD directions, the textile shrinks according to the ratio MD/CD and creates a flat structure. If the internal force causing the shrinkage has specifically the magnitude that is sufficient for overcoming the threshold points of resistance of the filaments against shrinkage, however not of such magnitude as to be sufficient to overcome the threshold point of resistance against the shrinkage of the structure in the MD/CD directions such that the lowest structural resistance is oriented predominantly in the Z direction, the textile will create the desired bulky structure. To a person with professional qualifications in the field of technology it will be evident that the required internal force causing shrinkage will be greater than the internal point of resistance of the filament, nevertheless, however, lower than the threshold point of resistance against the shrinkage of the structure in the MD/CD directions.

The first layer (T) of the invention comprises of a large number of filaments between which many mutual contact points are formed. When observing this layer on the millimetre and/or submillimetre scale, it is apparent that the filaments, or more precisely millimetre and/or submillimetre parts of the filaments, have, as a result of the action of the adjacent filaments, a unique state, where they are exposed to the effects of a unique combination of forces created during activation, which enables the production of an exceptionally wide diversity of filament shapes in the final structure. At the plane of the MD/CD directions, it may appear to be a contradiction that contrary to this the filaments remain in an almost perfectly flat level state. By contrast, however, the filament may shift "up" and "down" and create an extensive 3D structure encompassing all direction, which are the MD, CD and Z directions. In accordance with this invention and irrespective of the theoretical grounds, we are convinced that the wide diversity of directions of the endless filaments in the layer provides an advantage in terms of the final characteristics. According to the invention, the layer is homogeneous on the macroscopic scale. The wide diversity of filament shapes contained within a layer combined with the mutual interaction of these filaments enables gaining an advantage from this invention including primarily in that the layer is able to respond in the required manner to the action of external effects (e.g. to pressure and its release or to the effects of a liquid passing through it).

With substantial simplification it is possible to express the directional arrangement of the filaments also by means of the ratio between the "length of the filaments and the length of the textile".

Figure 5:
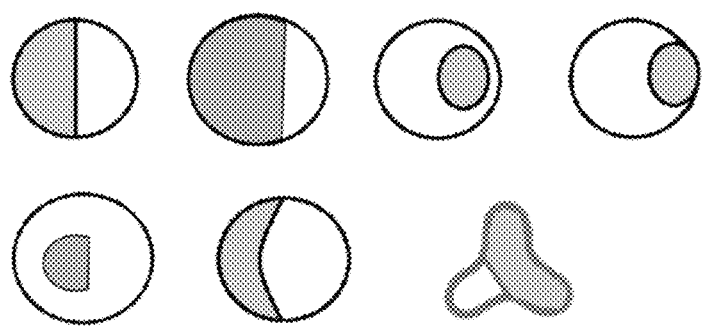

A layer M or T produced in this manner with a cross-section non-supportive of crimping contains at least 20% of filaments with a ratio "between the length of the filament and length of the textile" greater than 1.2, preferentially at least 30% of filaments with a ratio "between the length of the filament and length of the textile" greater than 1.2, preferentially at least 40% of filaments with a ratio "between the length of the filament and length of the textile" greater than 1.2, preferentially at least 50% of filaments with a ratio "between the length of the filament and length of the textile" greater than 1.2;

at least 10% of filaments with a ratio "between the length of the filament and length of the textile" greater than 1.5, preferentially at least 15% of filaments with a ratio "between the length of the filament and length of the textile" greater than 1.5, preferentially at least 20% of filaments with a ratio "between the length of the filament and length of the textile" greater than 1.5, preferentially at least 25% of filaments with a ratio "between the length of the filament and length of the textile" greater than 1.5, preferentially at least 30% of filaments with a ratio "between the length of the filament and length of the textile" greater than 1.5;

at least 5% of filaments with a ratio "between the length of the filament and length of the textile" greater than 2, preferentially at least 10% of filaments with a ratio "between the length of the filament and length of the textile" greater than 2, preferentially at least 15% of filaments with a ratio "between the length of the filament and length of the textile" greater than 2, preferentially at least 20% of filaments with a ratio "between the length of the filament and length of the textile" greater than 2;

A layer, M or T, produced in this manner with a cross-section non-supportive of crimping concurrently contains:
- at least 10% of filaments with a ratio "between the length of the filament and length of the textile" less than 2.5, preferentially at least 20% of filaments with a ratio "between the length of the filament and length of the textile" less than 2.5, preferentially at least 30% of filaments with a ratio "between the length of the filament and length of the textile" less than 2.5, preferentially at least 40% of filaments with a ratio "between the length of the filament and length of the textile" less than 2.5, preferentially at least 50% of filaments with a ratio "between the length of the filament and length of the textile" less than 2.5;
- at least 5% of filaments with a ratio "between the length of the filament and length of the textile" less than 2, preferentially at least 10% of filaments with a ratio "between the length of the filament and length of the textile" less than 2, preferentially at least 15% of filaments with a ratio "between the length of the filament and length of the textile" less than 2, preferentially at least 20% of filaments with a ratio "between the length of the filament and length of the textile" less than 2;

For the material according to the invention, it may be advantageous if the first layer T, alternatively both layer M and T contain endless filaments with a cross-section supportive of crimping (FIG. 5). These may be multi-component, preferentially bi-component. Irrespective of the theoretical grounds, we are convinced that crimping is supported by such cross-sections, where the centre-of-gravity of the surfaces created using one component arranged in the cross-section of the filaments is located at a distance from the centre-of-gravity of the surfaces of the other component.

In the area of technical knowledge, it is well known that a certain combination of polymers with differing levels of shrinkage, that are arranged in the so-called cross-section enabling formation by means of crimping, enable the so-called crimping to be achieved. At the same time, this may be either immediate spontaneous crimping or latent crimping the prerequisite for which is preceding activation (for example thermal activation). Filaments with cross-sections enabling formation by crimping provide regular curled sections creating so-called helical crimping. With substantial simplifications it is possible to declare that a filament with a cross-section enabling formation by crimping has a tendency towards bending in the direction towards the component with a greater degree of shrinkage, which creates uneven helical crimping. In other words, this means that the cross-section enabling formation by crimping causes regular mutual shifting of vectors of internal forces acting in the first and second component towards each other.

The layer of filaments may include, for example, predominantly endless filaments with a round cross-section, three-pointed cross-section and star cross-section, etc. (FIG. 1).

Crimping can be expected, for example, in arrangements of components in the cross-section types such as side-by-side, eccentric core/sheath, and others.

Similarly as in the preceding case, also here during the filament forming process—particularly during the cooling and drawing stages—polymer A is able to change its state, which is desirable with respect to the future activation phase. Polymer A can, for example, initially be in a semi-stable state (for example in a state with the lowest possible energy without ongoing crystallisation), whereupon it heats up during the activation phase and then slowly cools down in order to change the mentioned semi-stable state to another different, more stable state (for example to a state corresponding to a different lower-volume crystallisation phase) This change results in the creation of internal forces causing shrinkage, where we presume that their vector is directed in the direction of the median curve of the component of the filament. A change in the volume of polymer A in the case of filaments with a cross-section supporting crimping causes the intensification of the internal forces in the filament (an increase in the vector forces shifted relative to each other) and thereby, with high probability, the radius of the created arches is reduced, in the case of a layer of filaments this results in a certain "contraction" of the entire structure (=shrinkage).

Despite the fact that filaments with a cross-section supportive of crimping have a propensity towards creating regular shapes, specifically helical shapes, whilst this characteristic of the mentioned filaments relates namely to their propensity towards regular bending towards the side of the filament that includes the material with the higher shrinkage, these filaments in the layer are concurrently restricted by respective adjacent filaments that prevent them from maintaining a regular helix. Irrespective of the theoretical grounds, it is believed that the greater the force causing shrinkage prior to the deposition of the filaments on the belt, the greater will be the "degree of crimping per unit of length" of filaments, which is the reason for the existence of the larger number of helically-shaped parts located within the fibrous structure. If on the contrary, the level of crimping is lower, for example less than 25 twists per inch (each individual "loop" is located on more than 1 mm of length of the formed helix), then the free space between the filament contact points starts to become insufficient for maintaining even a part of the helix, whilst the conversely oriented forces caused by the mutual contact of the filaments increase in proportion to the magnitude. When the number of twists per inch is less than 15 (i.e. in the case that each individual "loop" is located on more than 2 mm of the length of the formed helix) it already becomes difficult to differentiate the parts of the helices and when the number of twists per inch is lower than 10 (i.e. in the case that each individual loop is located on more than 2.5 mm of the length of the formed helix) the constant forces acting in the filament are completely overcome by conversely oriented forces acting against the regular mutual shifting of vectors of the internal shrinkage forces, which enable the formation of regular crimping, as a result of which the structure acquires an entirely irregular appearance. A person with professional qualifications in the field of technology will, nevertheless, be aware of the fact that there exist also other various factors supporting the formation of a bulky structure caused by the regular mutual shifting of vectors of the internal shrinkage forces (in the case of filaments with a cross-section supportive of crimping) and the formation of a bulky structure caused by the irregular shrinkage of filaments (in the case of filaments with a cross-section not supportive of crimping). Examples of differences in structure, that are based on the crimping of filaments of synthetic silk are shown in FIG. 6 (whilst they are described in the article "Fiber Crimp Distribution in Nonwoven Structure" authored by Kunal Singh, Mrinal Singh and published in 2013 (available at the address http://article.sapub.org/10.5923.j.fs.20130301.03.html)

During the thermal activation of the structure, the volume of polymer A is reduced and thus so-called shrinkage of the entire structure results. For the material according to the invention, it may be advantageous if the first layer T, alternatively both layers M and T, which are subjected to activation, achieve in the CD of MD direction a degree of shrinkage of no more than 20%, preferentially no more than 15%, preferentially no more than 13%, preferentially no more than 11%, most preferentially no more than 9%. The degree of shrinkage of both layers may be different.

For one of the solutions according to the invention, it is advantageous when the first layer T exhibiting shrinkage is combined with a second layer M, which does not exhibit shrinkage. For this material according to the invention, it may be advantageous if on the first layer T, which is subjected to activation, in the CD or MD direction the achieved degree of shrinkage is no more than 20%, preferentially no more than 15%, preferentially no more than 13%, preferentially no more than 11%, most preferentially no more than 9%.

In one of the advantageous solutions according to the invention, where the first layer (T) utilises the shrinkage of a polymer (in the crimped and non-crimped version) it is preferentially created from core/sheath type bi-component filaments having a circular or three-pointed cross-section shape.

The endless filaments contained in this first layer T are formed from two or more components. The first component may be selected, for example, from the group encompassing polyesters (e.g. aromatic polyesters, which include polyethylene terephthalate (PET) or aliphatic polyesters, which include polylactic acid (PLA), polyamides, polyurethanes or their copolymers, or alternatively suitable blends. The scope of the invention includes the fact that the first component comprises or essentially comprises of a plastic selected from a group of polyesters, which also includes copolymers of polyester (coPET) or copolymers of polylactic acids (COPLA). The polyester that is preferentially used is polyethylene terephthalate (PET) or polylactic acid (PLA).

The second component B1 may be selected, for example, from the group that includes polyolefins (i.e. polypropylene or polyethylene), polymers with a low melting temperature, or alternatively copolymers or blends of suitable polymers. The scope of the invention includes the fact that the second component comprises or essentially comprises of a plastic selected from a group of polyesters, which also includes copolymers of polyester (coPET) or copolymers of polylactic acids (COPLA). The polyolefin that is preferentially used is polyethylene (PE).

The preferred combinations of components A/B selected for bi-component filaments in the nonwoven layer according to the invention are combinations PET/PE, PET/PP, PET/CoPET, PLA/COPLA, PLA/PE and PLA/PP.

In the case of bi-component filaments with a cross-section supporting crimping, it is a necessary condition to use a combination of polymers that in the given combination crimps, or possibly utilise, for example, nucleation agents or other additives supporting crimping.

Bi-component filaments have in the preferred configuration a ratio between the weight of the first component A1 and the weight of the second component B1 in the range from 50:50 to 90:10.

In a further form the configuration of the components may also contain additives intended for the modification of the characteristics of endless filaments. For example, the core may contain a colour pigment or a crimping agent. In the literature published in the field of technology, it is possible to identify various special combinations of crimping agents, which to a certain extent are able to change the behaviour of the polymers during crystallisation and shrinkage (as shown for example by author Gajanan in U.S. Pat. No. 5,753,736 that was submitted in 1995). Conversely, for example, ordinary titanium dioxide, which is frequently used as an additive for achieving a higher degree of whiteness, will cause only an insignificant change in the behaviour of the polymer, which is, if necessary, possible to compensate for by slightly adapting the process conditions.

The sheath may, for example, contain a colour pigment or surfactant (intended, for example, for achieving a silky touch and feel property). To a person with professional qualifications in the field of technology it will be evident that there exist many other possibilities derived from the requirements of specific applications of use.

In another form of the configuration, the components may also contain a certain amount of different polymers. A configuration is thus possible, for example, where the first component (e.g. core) contains a certain proportion of the polymer or polymers that forms the second component (e.g. sheath) or where on the other hand the second component (e.g. sheath) contains a certain proportion of a polymer or polymers that form the first component (e.g. core). In the published literature, it is possible to determine a certain level of content, by means of which it is possible to achieve an exact combination of polymers. For example the author Moore states (in patent application US2012088424 submitted by 3M Innovative Properties) that an admixture of up to 10% of polypropylene to polyester will provide filaments with stable properties.

In combination with this first layer (T) exhibiting a certain level of shrinkage, it is advantageous if the second layer (M) contains filaments with a lower or no level of shrinkage. In such a case, significantly smaller or no forces induced by the activation of the layer of filaments are exerted in the second layer (M) itself. Concurrently, by the effect of the adhesion of layers, or possibly by the effect of the forming bonding points between the layers, this second layer (M) is forced to change its arrangement in space (forced shrinkage) by the effect of the shrinkage of the first layer (T). Thereby, external forces are exerted that force the filaments in the structure to change their position. Without wanting to be bound by theory, we believe that the filaments or their parts orient themselves more in the z-direction and thereby the thickness of the nonwoven textile is increased. In advantageous cases the increase in the thickness of the textile is greater than the forced shrinkage in the MD and CD directions and thereby this leads to an increase in the total bulkiness of the layer and thus also to an increase in the bulkiness of the textile.

The combination of a shrinking and non-shrinking layers bonded by means of a calender roller in boding points or better yet described as by means of flat bonding embosses, which compact the filaments in a bonding emboss together and bond them locally by thermal effects is well known in the industry. The structure is subsequently activated by means of thermal flow (e.g. hot air), the shrinking layer shrinks and forces the non-shrinking layer to arch out into "cushions" between the bonding points—see for example patent application EP3192910 submitted by Reifenhauser GmbH & Co. KG Maschinenfabrik).

The nonwoven textile according to the invention has a different structure. Whilst in the case of the aforementioned patent application the strength of the textile is fundamentally given by the regular arrangement of the bonding embosses and activation is controlled in such a way as to prevent further bonding of the filaments (since further bonding would increase stiffness and reduce drapeability of the textile), the nonwoven textile according to the present invention undergoes activation of component A1 which is capable of shrinkage at a temperature corresponding to the bonding temperature of the B components. The textile according to the invention is not interconnected in local bonding embosses regularly arranged across the surface plane of the textile (given by the arrangement of the bosses on the calender roller), but rather is interconnected within the entire volume of the nonwoven textile, where essentially every intersection of filaments forms a bonding point that consolidates the textile. The textile according to the invention does not contain bonding embosses and arching "cushions" of free sections of filaments between them. On the contrary, its thickness is essentially homogeneous and free sections of filaments are much shorter (from one intersection of filaments to the next). At the same time, the absence of fixed bonding embosses enables, during the activation period, a certain degree of freedom of movement for the individual filaments in both layers. Concurrently, it generally applies that bonding with a calender and thus the creation of bonding embosses changes the shape of the filament plane of the emboss and flattens them completely. In the case of bi-component filaments, it not only melts the component with the lower melting point but also mechanically and thermally stresses the component with the higher melting point (for example by flattening it at the plane of the emboss) and creates weak points (for example the transition between the emboss and the free part of the filament). Without being bound by theory, it is believed that it is precisely the combination of limited stress on the component with the higher melting point (A) together with a degree of freedom of movement during the course of forced activation and instant fixation of the structure by means of hardening of the bonding component that enables the creation of a textile structure that is highly bulky, whilst supporting recovery and exhibiting softness and compressibility typical for the second layer M.

FIG. 7A, 7B shows the differences in the structure of the nonwoven textile bonded using bonding embosses V (FIG. 7A) and the structure bonded using heat flow for the creation of bonding points B throughout the entire volume (FIG. 7B).

It generally applies that a nonwoven textile bonded using a calender contains bonding embosses spaced millimetres from each other (typically 3-20 mm) and this distance also defines the sections of free filaments (typically 3-30 mm). The textile according to the invention is bonded thermally using thermal flow throughout its entire volume and contains bonding points at spacings, depending on the bulkiness of the structure, of approx. 0.3 to 8 mm of free filament sections. In both cases it applies that the lower limit is more typical for finer filaments and the upper limit for coarser filaments. The described typical limits present the average length of a free section of a filament in the structure.

Figure 8:

A forcibly shrunken second layer M may create a homogeneous layer with a regular arrangement of filaments, as can be seen, for example, in FIG. 8. It can also create a structure with various local degrees of arching of filament in layer M, as can be seen in FIG. 9 or even locally irregularly create a bulge of a bundle of filaments as can be seen in FIG. 10.

By means of a suitable configuration of process conditions, particularly process temperatures and drawing forces during the course of exposure of the textile to thermal flow and subsequent heating, it is thus possible to support and/or limit the creation of non-homogeneous forms and bulges. For example it is possible to create an irregular structure of bulges as can be seen in FIG. 11.

EXAMPLES

The recommended form of the configuration of the invention is thus characterised by at least two nonwoven layers. One of the advantageous configurations is a nonwoven textile according to the invention created by interconnecting at least two layers M and T of filaments produced using the spunbond procedure. The nonwoven textile may also be composed of several layers, where at least one layer represents the first layer T and another layer represents the second layer M and the textile also contains another layer X. Layer X may include, for example, a layer of meltblown-type of filaments, or a layer of staple fibres, etc.).

In the recommended form of the configuration of the invention there are multi-component or bi-component filaments, from which the layer T or M of the nonwoven textile is comprised, made by spinning in a spinner or using a spinneret, and subsequently preferentially passing through a cooler. Inside this cooler, the filaments are usually cooled by means of a fluid medium, primarily by means of cooling air. The scope of the invention encompasses the fact that spun filaments subsequently also pass through a drawing mechanism in which they are processed by being drawn. The drawn (extended) filaments are then deposited on a moving belt, where they form a layer of filaments. In one of the advantageous configurations, by means of adjusting specific parameters that determine the draw ratio, it is possible to then create filaments in the layer that have a controlled degree of potential shrinkage.

According to the preferred form of configuration of this invention an inserted diffuser will be used as a magazine mechanism, that controls the deposition of filaments and that is installed between the drawing mechanism and the filament deposition location. The scope of the invention encompasses the fact that at least one diffuser is used, the opposing side walls of which diverge from each other relative to the pass-through direction of the filaments. A highly recommended form of the configuration of the invention is characterised by the fact that the drive unit of the cooling mechanism and drawing mechanism is designed as an enclosed system. Inside this enclosed system, no additional air source is used, which would supplement the supply of external cooling media or cooling air into the cooling mechanism. Such an enclosed system has proven itself to be especially suitable in the production of nonwoven textiles.

In the case of the production of nonwoven textiles according to the invention utilising shrinkage, it was found that the technical solution according to this invention, which eliminates the problem associated with the shrinkage of filaments, is particularly functionally reliable and effectively feasible when the aforementioned closed unit is utilised, particularly when apart from the especially preferred form of configuration a diffuser is also used, which is arranged between the drawing mechanism and the filament deposition location. It has already been stated that the shrinkage of a nonwoven belt that is produced by means of the spunbond method can be very specifically adapted or regulated by means of the parameters of the draw ratio, cooling air/polymer ratio, and the speed of the filament.

From the already stated definition it is evident that production utilising the spunbond method includes the direct conversion of polymers to filaments, which are subsequently randomly spread out in the deposition location for the purpose of creating a nonwoven layer comprising of these filaments. The spunbond procedure determines both the characteristics of the individual filaments as well as the characteristics of the final nonwoven textile. The final produced nonwoven textile cannot always be used for determining the various characteristics and conditions of the individual filaments such as for example rheological characteristics, structural characteristics of the polymers and shrinkage, which occur during the individual production steps of this nonwoven textile. The potential shrinkage of a nonwoven textile generally determines its ability to create a bulky nonwoven textile, which is achieved by utilising the shrinkage of the individual filaments for achieving an increased relative thickness of the filament layer, which occurs, nevertheless, without the decomposition of the structure of the textile and/or without significant changes to the length and width of the filament layer. The scope of the invention includes the fact that the shrinkage of the filaments is defined with the use of various raw materials contained in the composition of the filaments and/or by means of setting differing material processing conditions during the production of the filaments for the nonwoven textile and/or by the use of differing filament cross-section shapes and/or by means of adjusting the mass ratio between the various input materials and/or by setting different filament orientations.

The recommended form of the configuration of the invention does not differentiate between filaments with cross-sections supporting crimping and filaments with cross-sections not supporting crimping. Both types can be used with advantage for certain applications. Likewise, a suitable combination can be created by using crimped and non-crimped filament layers. To a person with professional qualifications in the field of technology it will be evident that there exist technological advantages provided by filaments with cross-sections not supporting crimping as opposed to crimped filaments in achieving bulky and soft yielding materials. Unlike filaments with cross-sections not supportive of crimping, when processing filaments on which (spontaneous) crimping does occur during production, it is not easy to control the course of the production process. On most types of filaments, the cross-sections of which enable formation by crimping, the crimping is created during the deposition stage and/or at activation. Since during the crimping process the filaments move relative to each other, it is easy for them to come into mutual contact or for them to tangle into each other, which in other words can be expressed to mean that they can cause mutual interference. On nonwoven layers that include filaments with spontaneous crimping ability, there actually frequently exist limitations related to their shape and arrangement due to the uneven distribution of the filaments caused by their mutual movement. Essential subsequent measures that are necessitated by these limitations often include reduction of the processed amount, slowing down the production process and including additional special steps in the production process intended to securely set the relative positions of the filaments.

On filaments which do not undergo spontaneous crimping during the spinning, cooling and drawing process, it is possible to achieve far more even deposition of filaments in the layer, which enables the use of the lowest possible basis weight whilst retaining the required properties of the textile and/or whilst setting higher production line speeds and thus also a greater amount of processed material. It is thus much easier to control the course of the production procedure and in the case of a cross-section not supportive of crimping it is also possible to use more cheaply produced spinnerets and spinning beams.

The advantageous configuration of the invention also includes the fact that the resulting layer of filaments is thermally pre-consolidated, i.e. it is pre-consolidated and contains thermally formed bonds. One of the advantageous configurations of the invention is also the fact that the resulting nonwoven textile is thermally activated for the purpose of achieving a controlled shrinkage of at least one of the layers. Consolidation and possibly thermal activation is performed preferentially by means of at least one of the effects, which are contact with a flow of hot media (for example by means of hot air or infrared radiation) or and/or contact with a hot surface. An example of such a hot surface may be primarily a part of a roller. It is desirable for thermal activation to be performed under a condition where the shrinkage occurs evenly across the entire surface of the fibrous layer. Thermal activation can be performed in the chamber, into which hot air is supplied, or by means of the layer of filaments passing through an oven. It is also possible to perform thermal activation and consolidation by means of infrared or ultraviolet light, transmitted microwaves and/or laser radiation. It is necessary to stress the fact that within the scope of this described procedure performed "on the production line", thermal consolidation may also occur directly after completion of the preceding steps of the production procedure or both steps of the procedure, which are thermal activation and consolidation, may be performed "off the production line", that is separately from the preceding steps of the production procedure. Thermal activation is thus possible to perform essentially "off the production line", that is at a different time and place.

For the solution according to the invention it is advantageous when the flow of hot media passes through the textile and results thus in the transfer of heat throughout the entire volume of the nonwoven textile.

The required level of pre-consolidation of the fibrous textile/layer of filaments is to a significant degree dependent on the conditions of the production process. The deciding prerequisite is correctly setting the level of mutual cohesion of the filaments inside the layer of filaments, and thus also the possibility of controlling the level of mutual cohesion of the filaments on the basis of the requirements of the subsequent step in the production process. In the case, where the production process is performed on the production line with activation performed on the belt itself, the required level of cohesion is relatively low since it is only necessary for preventing defibration or thinning caused by significant undesirable movements during the activation process. In special cases, for example when the filaments in and of themselves provide a very good cohesion during contact between each other or with their base, which is enabled, for example, by the shape of their cross-section, speed of interlacement or their material composition, the cohesion characteristics of the layers of filaments may be sufficiently good even without thermal pre-consolidation. In other cases, for example when the production process is divided into two steps or when the layer of filaments is pre-consolidated prior to full activation and transferred, for example, in the form of rolls, then the required level of cohesion will be much higher, the result of which is also the requirement for a much higher level of pre-consolidation.

Activation temperature should be in the interval between the temperature of the glass transition and the softening temperature (Vicat softening temperature according to ISO DIN 306) of component/s A.

In one of the advantageous configurations, the invention provides bulky nonwoven textiles created using filaments with an adapted or controlled shrinkage of these filaments. Shrinkage occurs evenly throughout the entire layer of filaments, thanks to which the procedure should provide even nonwoven textile properties, that ensure even controlled shrinkage.

Inside the convection cooler, the filaments are usually cooled by means of a flowing medium, primarily by means of cooling air. As stated above, it is necessary that the potential shrinkage of filaments is evenly distributed throughout the entire range of length, width and thickness of the layer exhibiting shrinkage. The characteristics related to shrinkage can be modified by adaptation of the draw ratio, cooling air/polymer ratio, and the speed of the filament, whilst, according to the invention, these parameters are practically even for each individual filament.

The scope of the invention includes the fact that the created nonwoven textile includes several layers, of which at least one first layer T, alternatively at least one first layer T and one second layer M, alternatively each of the layers forming the nonwoven textile is created preferentially by means of the spunbond method in a spinning beam 1. At the same time it is obvious that multiple layers are deposited on top of each other and subsequently these layers are transferred together on at least one forming belt 2 into the mechanism 3 for final consolidation.

Filaments 4 are created by means of spinning in a spinneret 5. The arrangement of the filaments may be optimised by their alternating placement, by means of which a condition can be attained, where each of the individual filaments has a very similar weight and is supplied with cooling air of very similar temperature. The spinnerets may have varying numbers of capillaries and likewise varying diameters (d) and lengths (l) of these capillaries. The length (l) is, as a rule, calculated as the multiple of the diameter of the capillary and for this application area is selected in the range from 2 to 10 l/d. The number of capillaries needs to be selected on the basis of the required final diameter of the filament and the required or planned total processed amount of polymer together with the required filament spinning speed. The number of capillaries may change in the range 800-7000 capillaries per metre, at which it is possible to attain filaments with a diameter in the range from 8 to 45 µm. The diameter of the capillaries and the filament speed are selected to enable achieving the correct level of potential shrinkage of the final filament. The speed of the filament should be defined in the range 1000 to 10000 m/min, for filaments with a cross-section not supporting crimping and exhibiting shrinkage in the range 3000 to 5500 m/min and the diameter of the capillaries should be selected in the range from 200 to 1000 m, which enables achieving a suitable process draw ration in the range from 200 to 1300 in the case of circular capillaries, whilst for achieving the required level of production line productivity, in the case of these circular capillaries, it is most advantageous to have a draw ratio in the range from 300 to 800. Non-circular capillaries, as a rule, exhibit higher draw ratio values, which are to a significant degree dependent on the shape of the capillary and on the relative ratio of its surface and volume. The volume and temperature of the cooling air is set in such a way as to enable achieving the correct draw ratio and correct cooling conditions. It has been found that in respect to this invention, it is useful when the ratio of the cooling air volume to the spun polymer is in the range from 20:1 to 45:1. The volume and temperature of the cooling air are controlled in the cooler (6). This temperature can be set in the range from 10° C. to 90° C., preferentially in the range from 15° C. to 80° C., thus in such a way that the cooling conditions can be used in specific cases to control the course of shrinkage. The cooling conditions determine how quickly the filaments during the spinning process cool down from the melting temperature to the glass transition temperature. For example, setting a higher cooling air temperature results in a delayed cooling of the filaments. In practice, for the purposes of this invention, achieving the required and usable cooling air temperature range is easier when the cooler is divided into 2 zones in which the temperature range can be controlled separately. In the first zone 6a, which is located in the vicinity of the spinneret, the temperature can be set in the range from 10° C. to 90° C., preferentially in the range from 15° C. to 80° C. and most preferentially in the range from 15° C. to 70° C. In the second zone (6b), which is located in the direct vicinity of the first zone, the temperature can be set in the range from 10° C. to 80° C., preferentially in the range from 15° C. to 70° C. and most preferentially from 15° C. to 45° C.

Thereafter, filaments and guided through the drawing zone 7. Here the filaments are drawn by drawing forces created by the effect of the cooling air speed. The cooling air volume and the adjustable geometry of the drawing zone enable a certain air speed to be attained, which is subsequently transferred to the filament speed. This filament speed then together with the processed amount of polymer defines the diameter of the filaments. The potential shrinkage/contraction is regulated by means of the filament speed, the draw ratio and the cooling air/polymer ratio.

In the next step, the filaments are fed into the diffuser 8, the opposing walls of which diverge from each other relative to the travel direction of the filaments. The positions of these walls can be adjusted in a manner that enables attaining nonwoven textiles with an even composition, on which the individually deposited filaments form an arrangement exhibiting an omnidirectional orientation in the MD/CD plane.

Concurrently, it is evident that the deposited layer of filaments is affected by air, by the effect of which these filaments are fed into the diffuser. The air current can be adapted in a way as to create various arrangements, from evidently zigzag filament depositions up to truly circular loops and further more, likewise, elliptical structures oriented in the CD direction. Filaments are deposited on a formation belt and transported to at least one mechanism 9 for pre-consolidation. Cooling air flows through the deposited filament layer and through the formation belt and subsequently is channelled away from the processing area. The volume of the drawn air can be adjusted in a way that makes the deposition of filaments easier and, likewise, ensures effective contact of the filament layer with the formation belt. The pre-consolidation mechanism is located in the vicinity of the diffuser. The formation of the filament layer is controlled by means of drawn air throughout the entire scope of the route between the diffuser and the pre-consolidation mechanism. Pre-consolidation of the filament layer is performed by means of hot air.

The amount of energy transferred to the filament layer is controlled by a method that enables the filaments to be softened or pre-melted only to a certain degree, which ensures the attainment of good cohesion between the individual filaments. After the necessary cohesion between the filaments is attained, the fibrous layer can be transported to the formation belt without additional help of any auxiliary mechanism and without affecting or risking destruction/damage by the effect of forces that arise during this transport. This pre-consolidation procedure is likewise sufficient for moving the filament layer to a different deposition zone on a production line that includes multiple spinning beams. The energy transferred to the filaments is not sufficient for activation of shrinkage of these filaments. The method according to the invention includes the determination of balance between the pre-consolidation parameters: pre-consolidation temperature, pre-consolidation air speed and the pre-consolidation time. Pre-consolidation time is understood to mean the time during which the layer of filaments is modified by the pre-consolidation air.

It is recommended for the pre-consolidation time of the filament layer to be in the range from 1 to 10000 ms, preferentially in the range from 2 to 1000 ms and most preferentially in the range from 4 to 200 ms.

The speed of the pre-consolidation air that is used in this pre-consolidation unit is set in the range from 0.1 to 10 m/s, preferentially in the range from 0.8 to 4 m/s. It is recommended for the consolidation temperature during pre-consolidation to be in the range from 80° C. to 200° C., preferentially in the range from 100° C. to 180° C. In one of the forms of configuration, this pre-consolidation temperature is in the range from 90° C. to 150° C., primarily from 110° C. to 140° C.

According to various advantageous forms of configuration, the nonwoven textile includes a layer of bi-component filaments:
- one component (A) produced from polyethylene terephthalate (PET) and the second component (B) produced from a polyolefin, particularly polyethylene or polypropylene, whilst the pre-consolidation temperature is preferentially in the range from 110° C. to 160° C., especially from 120° C. to 150° C.
- one component (A) produced from polyethylene terephthalate (PET) and the second component (B) produced from a copolymer of polyethylene terephthalate (CoPET), whilst the pre-consolidation temperature is preferentially in the range from 110° C. to 180° C.
- one component (A) produced from polylactic acid (PLA) and the second component (B) produced from a polyolefin, particularly polyethylene or polypropylene, whilst the pre-consolidation temperature is preferentially in the range from 80° C. to 130° C.
- one component (A) produced from polypropylene (PP) and the second component (B) produced from a polyolefin, particularly polyethylene or a copolymer of polyethylene and polypropylene, the pre-consolidation temperature is preferentially in the range from 80° C. to 130° C.

In one of the advantageous configurations in the area of the production line, which is arranged following the diffuser, a layer of filaments is transported to at least one activation unit 10. The filaments are activated by means of hot air. At the same time it is understandable that the actual shrinkage of the shrinkable component of the filament is the function of the temperature of the shrinkable component of the filament and, likewise, the function of the duration of the time for which it is subjected to the effects of temperature. Furthermore, it is evident that also the speed of the shrinkage process depends on the temperature of the shrinkable component of the filament. Based on this invention, the course of the process is controlled by a method that includes a slow start to shrinkage, thanks to which the forces that are created within the layer as a result of this shrinkage are lower than the cohesion forces between the filaments. The result that can be achieved by this control of the process is attaining a cohesive and even structure of a nonwoven textile with a reduced density of the filament structure, which leads, likewise, to an increased thickness of this nonwoven textile.

According to one of the forms of configuration of the invention, the execution of the steps of the pre-consolidation and activation method, during which the time of the pre-consolidation and/or activation, air speed necessary for pre-consolidation and/or activation and the temperature pre-consolidation and activation are controlled by means of a combined method in a combined mechanism for pre-consolidation and activation.

One of the advantageous methods according to the invention includes the determination of the balance between the activation parameters: activation temperature, speed of activation air and activation time. Activation time is understood to mean the time during which the layer of filaments is modified by the activation air. It is evident that these parameters may be altered within the specified ranges in reaction to the potential level of shrinkage of the filament and, likewise, with the objective of setting the ideal combination between the activation time, activation temperature and activation air speed.

It is recommended for the activation time of the filament layer to be in the range from 20 to 5000 ms, preferentially in the range from 30 to 3000 ms and most preferentially in the range from 50 to 1000 ms.

The speed of the activation air that is used in this activation unit is set in the range from 0.1 to 2.5 m/s, preferentially in the range from 0.3 to 1.5 m/s. It is recommended for the activation temperature during thermal activation to be in the range from 80° C. to 200° C., preferentially in the range from 100° C. to 160° C. In one of the forms of configuration, this activation temperature is in the range from 90° C. to 140° C., primarily from 110° C. to 130° C.

According to various advantageous forms of configuration, the nonwoven textile includes a layer of bi-component filaments:
- one component (A) produced from polyethylene terephthalate (PET) and the second component (B) produced from a polyolefin, particularly polyethylene or polypropylene, whilst the activation temperature is preferentially in the range from 90° C. to 140° C., especially from 100° C. to 140° C.
- one component (A) is produced from polyethylene terephthalate (PET) and the second component (B) is produced from a copolymer of polyethylene terephthalate (CoPET), whilst the activation temperature is preferentially in the range from 120° C. to 160° C.
- one component (A) produced from polylactic acid (PLA) and the second component (B) produced from a polyolefin, particularly polyethylene or polypropylene, whilst the activation temperature is preferentially in the range from 80° C. to 140° C.

An advantageous configuration according to the invention includes the final consolidation procedure, which includes modifying the layer of filaments using hot air in the consolidating mechanism (3). Inside this consolidating mechanism, the layer of filaments is consolidated, whilst the layer may include a single layer or multiple layers with bonded filaments in this layer, respectively in these layers without concurrently resulting in a significant reduction in the thickness of this layer of filaments and without a noticeable consolidation gradient existing throughout the entire scope of the thickness of the nonwoven textile. It is evident that the residual thickness and elasticity of the nonwoven textile are affected by the consolidation temperature, since this consolidation temperature should be sufficiently high to enable attaining the necessary bonds between the filaments of the nonwoven textile, however, without softening or collapsing the processed layer of filaments. It is necessary that inside the consolidating mechanism the consolidation temperature and the consolidating forces acting on the layer of filaments adapted to the required effect of processing, which is a low level of softening and low internal forces. Concurrently, it is, nevertheless, necessary for the temperature and these forces to be sufficiently high for the required effect on the integrity of the layer of filaments for the production of the nonwoven textile. This can be achieved by means of multiple various devices, which include, for example, a consolidating mechanism with a bell-shaped drum, consolidating mechanism with a flat belt or a multiple-drum consolidating mechanism.

The consolidated nonwoven textile is in the final phase wound on to a spool (11). In the event that it is necessary to modify the surface characteristic of the nonwoven textile, for example for the purpose of achieving an improved transmission of fluids or an increase ability to drain them away, the spraying mechanism or the dip roll is located either between the moving belt and the final consolidating mechanism, or between the final consolidating mechanism and the spool.

One of the forms of configuration of the invention includes combining the steps of activation and consolidation together, where within the consolidating mechanism the activation time and/or consolidation time, the air speed necessary for the activation and/or consolidation, and activation and/or consolidation temperature are controlled.

A fundamental element is determining the balance between the consolidation parameters: consolidation temperature, speed of the consolidation air and the consolidation time. Consolidation time is understood to mean the time during which the layer of filaments is modified by the consolidation air. It is evident that these parameters may be altered within the specified ranges in reaction to the potential consolidation level of the layer of filaments and, likewise, with the objective of achieving the ideal combination between the consolidation time, consolidation temperature and consolidation air speed.

It is recommended for the consolidation time of the filament layer to be in the range from 200 to 20000 ms, preferentially in the range from 200 to 15000 ms and most preferentially in the range from 200 to 10000 ms.

The speed of the consolidation air that is used in this consolidation unit is set in the range from 0.2 to 4.0 m/s, preferentially in the range from 0.4 to 1.8 m/s. It is recommended for the consolidation temperature during thermal consolidation to be in the range from 100° C. to 250° C., preferentially in the range from 120° C. to 220° C. In one of the forms of configuration, this consolidation temperature is in the range from 90° C. to 140° C., primarily from 110° C. to 130° C.

According to various advantageous forms of configuration, the nonwoven textile includes a layer of bi-component filaments:
  one component (A) produced from polyethylene terephthalate (PET) and the second component (B) produced from a polyolefin, particularly polyethylene, whilst the consolidation temperature is preferentially in the range from 90° C. to 140° C., especially from 100° C. to 140° C.
  one component (A) produced from polyethylene terephthalate (PET) and the second component (B) produced from a polyolefin, particularly polypropylene, whilst the consolidation temperature is preferentially in the range from 90° C. to 160° C., especially from 110° C. to 160° C.
  one component (A) produced from polyethylene terephthalate (PET) and the second component (B) produced from a copolymer of polyethylene terephthalate (Co-PET), whilst the consolidation temperature is preferentially in the range from 140° C. to 230° C.
  one component (A) produced from polylactic acid (PLA) and the second component (B) produced from a polyolefin, particularly polyethylene or polypropylene, whilst the consolidation temperature is preferentially in the range from 80° C. to 140° C.
  one component (A) produced from polypropylene (PP) and the second component (B) produced from a polyolefin, particularly polyethylene or a copolymer of polypropylene and polyethylene, whilst the consolidation temperature is preferentially in the range from 90° C. to 140° C., especially from 100° C. to 140° C.

The nonwoven textile according to the invention contains a combination of layers of various compositions, a suitable pre-consolidation, activation and bonding temperature derived from the penetration of intervals of recommended temperatures for the individual layers. The above specified temperature ranges can be used in various, mutually separated steps in such a way that the consolidation air temperature and, likewise, the consolidation air speed remain in the specified range even despite the fact that the consolidation mechanisms will have differing levels in the various zones.

This invention is based on the finding that a nonwoven textile according to the invention can be designed in such a way to be on the one hand relatively bulky and thanks to that have a relatively large thickness, whilst on the other hand maintain its satisfactory stability. The layer according to the invention has outstanding elasticity even after being subjected to the effects of a load, namely a pressure load. It is possible to achieve these advantageous characteristics at relatively low nonwoven textile basis weights.

For the method according to the invention, there exists, furthermore, a specific advantage in the fact that continuous production of the nonwoven textile is performed in a simple method, at relatively high production speeds and without interruptions to the production process. The production parameters of the nonwoven textile are highly variable, flexible and adaptable during the production process, thanks to which it is possible to produce different end products without interrupting the production process. Also the steps of the procedure including pre-consolidation, activation and consolidation can be easily modified as far as their parameters are concerned.

The method according to the invention can be performed by means of a simple method "on the production line", however whilst retaining the option of performing various production procedure steps "off the production line" if necessary. The pre-consolidation, shrinkage activation and final consolidation steps can thus be, without any problems, separated from the actual production of the layered material. It can be concluded that it is possible to produce an entirely new textile having a very advantageous 3D structured surface, with large bulkiness and large thickness, whilst exhibiting satisfactory compression strength by means of a simple, inexpensive and effective method. Various parameters of the nonwoven textile or resulting nonwoven layer are variable and flexibly adaptable during the entire production procedure.

The nonwoven textile according to the invention can be, for example a two-layer textile, produced on the laboratory production line of the Centre of Polymer Systems at the UTB University in Zlin. This laboratory production line model number LBS-300 is able to produce mono-component or bi-component filaments for spunbond or meltblown type nonwoven textiles. Its extrusion system that includes two extruders, can heat polymers to a temperature of 450° C. Spunbond type nonwoven textile filaments can be produced using the spunbond-type extruder having 72 holes (with a diameter of 0.35 mm and length 1.4 mm) on a square area measuring 6×6 cm. There exist several possible arrangements for extruders for processing bi-component filaments—core/sheath, side-by-side arranged components, sectors or islands. The system is open, the pressure of the drawing air is available on the input system up to a level of 150 kPa. The filaments can be removed in their original condition or may be deposited on a belt running at a speed in the range from 0.7 to 12 m/min. The final width of the product is no more than 10 cm. The total extruded amount can be set in the range from 0.02 to 2.70 kg/h. The final basis weight can be set in the range from 30 to 150 g/m². Furthermore, there exists the option of consolidation the layer of filaments by using a calender roll at a temperature of up to 250° C.

To create a model of consolidation by a current of air in laboratory conditions (examples 1-4) a standard stationary oven was used. As a result of very different heat transfer conditions existing inside the oven with a static atmosphere and in the mechanism with forced air current passing through the textile and, likewise, as a result of the existence of thermal losses arising when the oven is opened and closed, it would be necessary to set an activation+bonding time to 3 minutes at 130° C.

The aforementioned laboratory production line was used to create the layers described in the examples. In examples 1-6 a compact roller was used behind the spinning beam at room temperature with minimum downward pressure. In the other examples, a current of hot air (130° C.) created using a hot air gun with an attachment was used instead of the compact roller.

The nonwoven textile includes two layers of circular cross-section core/sheath type bi-component filaments. The mass proportions of the core and sheath and the production line settings are provided in the table. In the production of the individual layers, the following temperature profiles were set for the defined combinations of polymers:

PET/PE:
Component A=PET (polyethylene terephthalate, polymer type 5520, manufacturer Invista)
Component B=PE (polyethylene, ASPUN 6834, manufacturer Dow)

The extruder for component A was heated to a temperature of 340° C. (3 zones were heated to 340° C., 335° C., and 325° C. respectively), the extruder for component B was heated to a temperature of 235° C. (3 zones were heated to 200° C., 215° C., and 235° C. respectively). The temperature of the spinning beam was set to 305° C. The amount of processed polymer was set to 0.25 g/min/capillary. The filaments were cooled using air with a temperature of 20° C.

PP/PE:
Component A=PP (polypropylene, Tatren HT 2511, manufacturer Slovnaft)
Component B=PE (polyethylene, ASPUN 6834, manufacturer Dow)

The extruder for component A was heated to (3 zones were heated to 195° C., 220° C., and 240° C. respectively), the extruder for component B was heated to a temperature of 235° C. (3 zones were heated to 200° C., 215° C., and 235° C. respectively). The temperature of the spinning beam was set to 240° C. The amount of processed polymer was set to 0.25 g/min/capillary. The filaments were cooled using air with a temperature of 20° C.

PLA/PE:
Component A=PLA (polylactic acid, Ingeo, manufacturer Nature Works)
Component B=PE (polyethylene, ASPUN 6834, manufacturer Dow)

The extruder for component A was heated to a temperature of 240° C. (3 zones were heated to 195° C., 220° C., and 240° C. respectively), the extruder for component B was heated to a temperature of 235° C. (3 zones were heated to 200° C., 215° C., and 235° C. respectively). The temperature of the spinning beam was set to 240° C. The amount of processed polymer was set to 0.25 g/min/capillary. The filaments were cooled using air with a temperature of 20° C.

PLA/coPLA:
Component A=PLA (polylactic acid, Ingeo, manufacturer Nature Works)
Component B=coPLA (copolymer of polylactic acid, Ingeo, manufacturer Nature Works)

The extruder for component A was heated to a temperature of 240° C. (3 zones were heated to 195° C., 220° C., and 240° C. respectively), the extruder for component B was heated to a temperature of 235° C. (3 zones were heated to 200° C., 215° C., and 235° C. respectively). The temperature of the spinning beam was set to 240° C. The amount of processed polymer was set to 0.25 g/min/capillary. The filaments were cooled using air with a temperature of 20° C.

| | | example | | | | | |
|---|---|---|---|---|---|---|---|
| | | 1 comparative | 2 invention | 3 invention | 4 invention | 5 invention | 6 comparative |
| pre-consolidation | | | | compact roller | | | |
| A1 | | PET | PET | PET | PET | PET | PP |
| B1 | | PE | PE | PE | PE | PE | PE |
| A1/B1 | | 70/30 | 70/30 | 70/30 | 70/30 | 70/30 | 60/40 |
| type of filament in layer T | | C/S | C/S | C/S | C/S | C/S | C/S |
| A2 | | PET | PP | PP | PP | PP | PP |
| B2 | | PE | PE | PE | PE | PE | PE |
| A2/B2 | | 70/30 | 60/40 | 40/60 | 60/40 | 40/60 | 60/40 |
| Type of filament in layer M | | C/S | C/S | C/S | C/S | C/S | C/S |
| Basis weight (layer T + layer M) | gsm | 40 + 40 | 40 + 30 | 40 + 30 | 80 + 60 | 80 + 60 | 60 + 60 |
| Tensile strength @ MD | N/cm | 2 | 1 | 2 | 2 | 1 | 3 |
| Elongation at maximum strength (elong. at peak) - MD | % | 2 | 115 | 114 | 121 | 111 | 126 |
| Diameter of filament in layer T | μm | 23 | 22 | 23 | 23 | 22 | x |
| Diameter of filament in layer M | μm | x | 23 | 22 | 21 | 20 | 21 |

| | | example | | | | | |
|---|---|---|---|---|---|---|---|
| | | 1 comparative | 2 invention | 3 invention | 4 invention | 5 invention | 6 comparative |
| Recovery | % | 99 | 97 | 97 | 97 | 98 | 87 |
| Elasticity | % | 15 | 24 | 24 | 18 | 17 | 19 |
| Compressibility | mm | 0.414 | 0.214 | 0.202 | 0.257 | 0.248 | 0.169 |
| Thickness | mm | 0.76 | 0.89 | 0.84 | 1.43 | 1.38 | 0.89 |
| bulkiness | m³/kg | 105 | 79 | 83 | 98 | 101 | 136 |
| Average shrinkage % MD | | −6% | −5% | −5% | −4% | −5% | 0% |
| Average shrinkage % CD | | −4% | −4% | −4% | −2% | −3% | 0% |
| Average shrinkage % z | | 13% | 25% | 28% | 28% | 26% | 2% |

In examples 1-6, for the first pre-consolidation of filaments, a compact roller at room temperature was used directly behind the spinning beam, which significantly affected the structural change caused by activation of layer T—the increase in thickness (in the z direction) was significantly limited. Example 6 shows that layer M does not shrink in and of itself. Example 1 shows the degree of increase in the thickness of the textile including layer T by 13%. The calculation of the change in the bulkiness of the textile shows that the increase in thickness approximately corresponds to the reduction in length and width and that the total volume of the textile has not changed. Examples 2-5 show at approximately the same shrinkage in the MD and CD direction a more significant increase in the thickness of the nonwoven textile, that also corresponds to an increase in the total volume (approx. +15% to +20%). Without wanting to be bound by theory, we assume that this increase is caused by the forced shrinkage of layer M.

In examples 7-11, a current of hot air at a temperature of 130° C. was used directly behind the spinning beam for the first pre-consolidation of the filaments. The filaments were not compressed and the structural change in the course of activation occurred significantly in the z-direction and also the total bulkiness of the material increased significantly.

In examples 2-8 and 8-11, according to the invention, in the first layer T the core includes polymer A1 (polyethylene terephthalate, polymer type 5520, manufacturer Invista) and in the second layer M the core includes polymer A2 (polyethylene, ASPUN 6834, Manufacturer Dow). The difference in the tensile and flexural elasticity modulus is greater than 500 MPa. Examples, according to the invention, 4+5 and 10+11 show compared to examples, according to the invention, 2+3 and 8+9 a smaller bulkiness, which is caused primarily by the significant difference in the basis weight of the nonwoven textile. The higher total basis weight also represents a greater load on the bottom layer, which is, thanks to its elasticity, slightly loose and thus the total bulkiness of the layer is reduced.

| | | example | | | | |
|---|---|---|---|---|---|---|
| | | 7 comparative | 8 invention | 9 invention | 10 invention | 11 invention |
| pre-consolidation | | Hot air current (HAK) | | | | |
| A1 | | PET | PET | PET | PET | PET |
| B1 | | PE | PE | PE | PE | PE |
| A1/B1 | | 70/30 | 70/30 | 70/30 | 70/30 | 70/30 |
| type of filament in layer T | | C/S | C/S | C/S | C/S | C/S |
| A2 | | PET | PP | PP | PP | PP |
| B2 | | PE | PE | PE | PE | PE |
| A2/B2 | | 70/30 | 60/40 | 60/40 | 60/40 | 40/60 |
| Type of filament in layer M | | C/S | C/S | C/S | C/S | C/S |
| Basis weight | gsm | 40 + 40 | 40 + 30 | 40 + 30 | 80 + 60 | 80 + 60 |
| Diameter of filament in layer T | μm | 22 | 23 | 35 | 23 | 22 |
| Diameter of filament in layer M | μm | 22 | 21 | 19 | 22 | 22 |
| Recovery | % | 99 | 98 | 97 | 97 | 99 |
| Elasticity | % | 35 | 40 | 44 | 38 | 40 |
| Compressibility | mm | 0.496 | 0.608 | 0.779 | 0.840 | 0.864 |
| Thickness | mm | 1.34 | 1.52 | 1.77 | 2.21 | 2.16 |
| Bulkiness | m³/kg | 60 | 46 | 44 | 63 | 65 |
| Average shrinkage % MD | | −5% | −6% | −5% | −6% | −4% |
| Average shrinkage % CD | | −6% | −4% | −4% | −6% | −2% |
| Average shrinkage % z | | 92% | 130% | 131% | 123% | 119% |

|  |  | example | | | | |
|---|---|---|---|---|---|---|
|  |  | 13 invention | 14 invention | 15 invention | 16 invention | 17 invention |
| pre-consolidation |  | Hot air current (HAK) | | | | |
| A1 |  | PLA | PET | PET | PET | PP1 |
| B1 |  | PE | PE | PE | PE | PE |
| A1/B1 |  | 60/40 | 70/30 | 70/30 | 70/30 | 70/30 |
| type of filament in layer T |  | C/S | C/S | eC/S | C/S | C/S |
| A2 |  | PP | PP | PP | Crimped staple cellulose fibres and powder PE | PP2 |
| B2 |  | PE | PE | PE |  | PE |
| A2/B2 |  | 50/50 | 50/50 | 50/50 |  | 70/30 |
| Type of filament in layer M |  | C/S | S/S | C/S |  | C/S |
| Basis weight | gsm | 40 + 30 | 40 + 30 | 40 + 30 | 40 + 120 | 12.5 + 12.5 |
| Diameter of filament in layer T | um | 25 | 23 | 30 | 30 | 27 |
| Diameter of filament in layer M | um | 23 | 23 | 23 | 25 | 17 |
| Recovery | % | 98 | 98 | 95 | 99 | 85 |
| Elasticity | % | 35 | 30 | 33 | 55 | 57 |
| Compressibility | mm | 0.466 | 0.438 | 0.452 | 3.960 | 0.428 |
| Thickness | mm | 1.33 | 1.46 | 1.37 | 7.20 | 0.45 |
| bulkiness | m³/kg | 53 | 48 | 51 | 22 | 56 |
| Average shrinkage % MD |  | −6% | −4% | −9% | −5% | 0% |
| Average shrinkage % CD |  | −4% | −3% | −11% | −6% | 0% |
| Average shrinkage % z |  | 43% | 108% | 67% | 23% | 3% |

In examples 13-17, a current of hot air at a temperature of 130° C. was used directly behind the spinning beam for the first pre-consolidation of the filaments. In examples 14 and 15, filaments with a cross-section supporting crimping (eC/S, S/S) were used in one of the layers.

In example 13, according to the invention, in the first layer T the core includes the first load bearing polymer A1 (polylactic acid, Ingeo, manufacturer Nature Works) and in the second layer M the second load bearing core includes polymer A2 (polyethylene, ASPUN 6834, Manufacturer Dow). The difference in the tensile and flexural elasticity modulus is greater than 200 MPa.

In examples 14-15, according to the invention, in the first layer T the core includes polymer A1 (polyethylene terephthalate, polymer type 5520, manufacturer Invista) and in the second layer M the core includes polymer A2 (polyethylene, ASPUN 6834, Manufacturer Dow). The difference in the tensile and flexural elasticity modulus is greater than 500 MPa.

Example 16 describes the combination of layer T from spunbond filaments and layer M from crimped cellulose staple fibres (air laid). The ratio of forces necessary to bend the filament by 900 is greater than 2 (filament from polymer A1): 1 (cellulose fibre)

In example 17, according to the invention, in the first layer T the core includes the first load bearing polymer A1 (polypropylene 1=Mosten NB425 from Unipetrol) and in the second layer M the second load bearing core includes polymer A2 (polypropylene 2=MR 2002 from Total Petrochemicals). The difference in the flexural elasticity modulus is 100 MPa.

Examples 1-5 and 7-16 utilise shrinkage. Examples 6 and 7 do not contain any layer that shrinks.

The following examples 18-20 represent a nonwoven textile, produced on a spunmelt production line using the REICOFIL 5 technology with two bi-component spunbond-type spinnerets.

Example 18

The first layer (T) was produced using the bi-component nozzles of the type sheath/core (C/S) with a round cross-section. The weight ratio of the components A:B in the filament was 70:30. The core of the filaments was formed of PET (a polymer type 5520 by Invista) and the sheath was formed of PE (ASPUN 6834 by Dow). The production conditions were such that the filaments formed irregular arches or wavy sections in arbitratry orientations. The layer was pre-consolidated using HAK (hot-air knife) and HAF (hot-air flow). The second layer (M) was produced using bicomponent nozzles of the type sheath/core (C/S) with a round cross-section and deposited on the first pre-consolidated layer. The weight ratio of the components in the filament was 70:30. The core of the filaments was made of PP (polymer type HG475FB by Borealis) and the sheath was made of PE (ASPUN 6834 by Dow). The filaments themselves in the layer do not exhibit crimping. Both layers were together subjected to further pre-consolidation using HAK (hot-air knife) and HAF (hot-air flow) and subsequently were fully connected by hot air in the bonding unit.

Example 19

The first layer (T) was produced using bi-component nozzles of the type eccentric core/sheath (eC/S) with a round cross-section (the nozzles used were the nozzles disclosed in the European patent application EP3771761 by REIFENHAUSER GMBH & CO. KG MASCHINENFABRIK). The weight ratio of the components in the filament was 50:50. The core of the filaments was made of PP (polymer type 3155 by Exxon) and the sheath was made of PE (ASPUN 6850 by Dow). The production conditions were set such that the filaments formed crimps. The layer was pre-consolidated using HAK (hot-air knife) and HAF (hot-air flow). The second layer M was produced using bi-component nozzles of the type eccentric core/sheath (eC/S), identical as in the first layer, and deposited on the first pre-consolidated layer. The weight ratio of the components A:B in the filament was 45:55. The core of the filaments was made of a blend of PP (polymer type 3155 by Exxon mixed with 4.5% of polymer type HL712FB by Borealis and 0.6% of a white $TiO_2$ pigment) and the sheath was made of PE (ASPUN 6834 by Dow). The production conditions were set such that the filaments themselves formed crimps. Both layers were together subjected to a further pre-consolidation using HAK (hot-air knife) and HAF (hot-air flow) and were subsequently connected by hot air in the bonding unit.

Example 20

The first layer T was produced using bi-component nozzles of the type sheath/core (C/S) with a round cross-section. The weight ratio of the components A:B in the filament was 70:30. The core of the filaments was formed of PET (polymer type 5520 by Invista) and the sheath was formed of PE (ASPUN 6834 by Dow). Production conditions were set such that the filaments formed irregular arches or wavy sections in arbitratry directions. The layer was pre-consolidated using HAK (hot-air knife) and HAF (hot-air flow). The second layer M was produced using bicomponent nozzles of the type eccentric core/sheath (eC/S) with a round cross-section (the nozzles used were the nozzle disclosed in the European patent application EP3771761 by REIFENHAUSER GMBH & CO. KG MASCHINENFABRIK) and deposited on the first pre-consolidated layer. The weight ratio of the components A:B in the filament was 45:55. The core of the filaments was formed of a blend of PP (polymer type 3155 by Exxon mixed with 4.5% of a polymer type HL712FB by Borealis and 0.6% of a white TiO2 pigment) and the sheath was formed of PE (ASPUN 6834 by Dow). The prosuction conditions were set such that the filaments themselves in this layer formed crimps. Both layers were together subjected to a further pre-consolidation using HAK (hot-air knife) and HAF (hot-air flow) and subsequently were fully interconnected by hot air in the bonding unit.

The process parameters of the examples 18-20 were set according to the description above, the exact values are set out in the table below.

|  | Example | | |
| --- | --- | --- | --- |
|  | 18 | 19 | 20 |
| A1 | PET | PP | PET |
| B1 | PE | PE1 | PE |
| A1/B1 | 70/30 | 50/50 | 70/30 |
| First layer filament type | C/S | eC/S | C/S |
| A2 | PP | PP blend | PP |
| B2 | PE | PE2 | PE |
| A2/B2 | 70/30 | 45/55 | 45/55 |
| Second layer filament type | C/S | eC/S | eC/S |
| Basis weight (g/m2) | 30 + 30 | 30 + 30 | 35 + 25 |
| Melting point A1 | Over 200° C. | Over 150° C. | Over 200° C. |
| Melting point B1 | 130° C. | 131° C. | 130° C. |
| Melting point A2 | 161° C. | Over 140° C. | 161° C. |
| Melting point B2 | 130° C. | 130° C. | 130° C. |
| Difference in Flexural modulus A1-A2 | Over 500 MPa | Over 200 MPa | Over 500 MPa |
| Difference in Young's modulus A1-A2 | Over 500 MPa | Over 200 MPa | Over 500 MPa |
| Thickness (mm) | 0.9 | 1.0 | 1.2 |
| Bulkiness (m3/kg) | 66.7 | 54.6 | 50.0 |
| Strength MD (N/5 cm) | 784 | 55.5 | 77.3 |
| Elongation at Peak MD (%) | 59 | 67 | 60 |
| Elasticity (%) | 19 | 22 | 33 |
| Compressibility (mm) | 0.17 | 0.22 | 0.37 |
| Recovery (%) | 98 | 86 | 99 |

-continued

|  | Example | | |
| --- | --- | --- | --- |
|  | 18 | 19 | 20 |
| Average shrinkage | Less than 10% of the width | Less than 10% of the width | Less than 10% of the width |
| Filaments of the first layer (T) (micron) | 24 | 21 | 25 |
| Filaments of the second layer (M) (micron) | 23 | 18 | 22 |
| Abrasion resistance from the side of the first layer (T) | 1 | 4 | 1 |
| Abrasion resistance from the side of the second layer (M) | 4 | 4 | 4 |

Examples 18-20 show e.g. possibilities of various combinations of the weight of the layers. In Example 18, the output of the individual spinnerets was set such that symmetrical products (30+30 gsm) were achieved). By contrast, in Example 20, both spinnerets were set to the optimal output and the spinneret, producing filaments with higher average density, also produced higher weight of filaments per unit area (35+25 gsm). In Example 19, the densities od the filaments were identical and the weights of the filaments per unit area were symmetrical as well.

Examples 18-90 also show further possible benefits of the invention. If, as in these examples, the layers M and T are used as the outer layers of the composite, the final product can make us of the advantages of their different properties e.g. in terms of its own "double-sidedness". For example, one outer layer of the Examples 18 and 20 is formed by a layer T with a high abrasion resistance (grade 1) and the second layer exhibits nearly no resistance (grade 4). In Example 19, the difference in properties does not manifest in the abrasion resistance, but e.g. in the subjectively perceived softness, wherein the product is rated as softer from the side of the layer M.

Testing Methods

The "Basis weight" of a nonwoven textile is measured using testing methodology according to norm EN ISO 9073-1:1989 (corresponding to methodology WSP 130.1). For measurement, 10 layers of nonwoven textile are used, whilst the sample size is 10×10 cm2.

"Thickness" or "measured height" of a nonwoven material is determined by means of a testing measurement methodology pursuant to European norm EN ISO 9073-2: 1995 (corresponds to methodology WSP 120.6), which is modified in the following manner:
  1. The material is to be measured by using a sample that is taken from production without being subjected to higher deformation forces or without being subjected to the effect of pressure for longer than a day (for example by the pressure exerted by the roller on the production equipment), whilst otherwise the material must be left for at least 24 hours laying freely on a surface.
  2. The total weight of the top arm of the measuring machine including additional ballast is 130 g.

The term "regeneration" or "recovery" of bulkiness here relates to the ratio between the thickness of the textile after the release of the acting load and the initial thickness of this textile. The thickness of a textile is measured pursuant to norm EN ISO 9073-2:1995 whilst using a preliminary load force equivalent to a pressure of 0.5 kPa. The procedure for the measurement of regeneration includes the following steps:

1. Preparation of textile samples of dimensions 10×10 cm
2. Measurement of thickness of 1 piece of textile
3. Measurement of thickness of 5 pieces of textile placed on top of each other by using a preliminary load force equivalent to a pressure of 0.5 kPa (Ts)
4. Application of load on to 5 pieces of textile placed on top of each other (by a pressure of 2.5 kPa) on a thickness measurement device for 5 minutes
5. Release of device and wait for 5 minutes
6. Measurement of thickness of 5 pieces of textile placed on top of each other by using a preliminary load force equivalent to a pressure of 0.5 kPa (Tr)
7. Calculation of regeneration according to the following equation:

$$\text{Regeneration} = Tr/Ts \text{ (without unit)}$$

Ts=thickness of fresh sample
Tr=thickness of regenerated sample

The term "compressibility" here relates to the distance in millimetres by which a nonwoven textile is compressed by the effect of a load defined during the measurement of "elasticity". It can be calculated also as the product of elasticity (without unit)*thickness (mm). The "Elasticity" of a nonwoven textile is measured using testing methodology according to norm EN ISO 964-1, which is modified in the following manner:
1. The thickness of one textile layer is measured.
2. Several samples of the textile are prepared so that their total thickness after being stacked on top of each other is at least 4 mm, most preferably 5 mm. The group of textile pieces stacked on top of each other contain at least 1 piece of textile.
3. The thickness of these stacked textile samples is measured
4. A force of magnitude 5 N is allowed to act on to this group of stacked textile samples as a load speed of 5 mm/min
5. The distance corresponding to the movement of the clamping elements is measured
6. Elasticity is calculated according this equation:

$$R \text{ (without unit)} = T1(\text{mm})/T0(\text{mm})$$

Or $$R (\%) = T1(\text{mm})/T0(\text{mm}) * 100\%$$

T1=distance corresponding to the movement of the clamping elements at a load with a magnitude of 5 N [mm]=degree of compression of the stacked textile pieces
T0=thickness (according to norm EN ISO 9073-2:1995 applying a preliminary load force of 1.06 N) [mm]

"Length of endless filament to textile length ratio" can be measured using three different methods:
a) Length of filaments is measured by tensioning filaments in such a way as to spread them in the linear section, without exhibiting crimping
b) On a textile consolidated to attain a specific level it is not possible to use method a) for measurement of the filament length and thus it is necessary to use the following estimation:
  a. Take an image of the assessed layer at a magnification that enables sufficient visibility of the filaments
  b. One single filament is selected and the pathway of its passage through the whole image or at least a part of this image
  c. Based on the measured length of the filament that is designated in the image, the actual length of this filament is estimated
  d. The length of the textile in which the described filament is designated is measured
  e. The (percentage) ratio between the estimated length of the filament and the measured length of the textile is calculated
c) In the textile, using the "determination method for statistical geometric values of filaments in a nonwoven material", where:
  a. A geometric textile representation, which was selected for analysis, measures 8 mm in the MD direction and 8 mm in the CD direction, whilst maintaining full thickness of the sample in the Z direction.
  b. From the perspective of measurement, the only relevant filaments in the textile are those which enter the cut sample from one side and exit out through the opposing side.
  c. It is necessary to measure at least 20 filaments.
  d. The (percentage) ratio between the length of the filament and the measured length of the textile is calculated The "length of the free filament section", that is the length of the free filament section between the bonding points or the bonding embosses can only be determined essentially using two different methods.
1) estimation using a two-dimensional image of the textile:
  a. Take a image of the assessed layer at a magnification that enables sufficient visibility of the filaments
  b. Mark out the free filament sections
  c. Measure the lengths of the marked out filament sections
  d. Measurement is performed on at least 100 randomly selected filament sections, whilst following the basic rules of random selection and a statistical calculation is made to determine the median length of a free filament section.
2) In the textile, using the "determination method for statistical geometric values of filaments in a nonwoven material", where:
  a. A geometric textile representation, which was selected for analysis, measures at least 8 mm in the MD direction and 8 mm in the CD direction, whilst maintaining full thickness of the sample in the Z direction.
  b. In terms of measurement, the only filaments that are relevant are those in such a cut sample that lead from one bonding point to another, or from one bonding emboss to another, or alternatively from one bonding emboss to another bonding point.
  c. Measurement is performed on at least 100 randomly selected filament sections, whilst following the basic rules of random selection and a statistical calculation is made to determine the median length of a free filament section.

"Martindale Average Abrasion Resistance Grade Test" or "Martindale"

FIG. 38 is a perspective view of equipment for the Martindale Average Abrasion Resistance Grade Test. FIG. 39 is a grade scale for fuzz assessment in the Martindale Average Abrasion Resistance Grade Test herein as described in published patent application US20200170853A1 of Procter and Gamble company Martindale Average Abrasion Resistance Grade of a nonwoven is measured using a Martindale Abrasion Tester. The test is conducted dry.

Nonwoven samples are conditioned for 24 hours at 23±2° C. and at 50±2% relative humidity.

From each nonwoven sample, cut 10 circular samples 162 mm (6.375 inches) in diameter. Cut a piece of Standard Felt into a circle of 140 mm in diameter.

Secure each sample on each testing abrading table position of the Martindale by first placing the cut felt, then the cut nonwoven sample. Then secure the clamping ring, so no wrinkles are visible on the nonwoven sample.

Assemble the abradant holder. The abradant is a 38 mm diameter FDA compliant silicone rubber 1/32 inch thick (obtained from McMaster Carr, Item 86045K21-50A). Place the required weight in the abradant holder to apply 9 kPa pressure to the sample. Place the assembled abradant holder in the Model #864 such that the abradant contacts the NW sample as directed in the Operator's Guide.

Operate the Martindale abrasion under conditions below:
Mode: Abrasion Test
Speed: 47.5 cycles per minute; and
Cycles: 16 cycles After the test stops, place the abraded nonwoven on a smooth, matte, black surface and grade its fuzz level using the scale provided in FIG. 14. Each sample is evaluated by observing both from the top, to determine dimension and number of defects, and from the side, to determine the height of the loft of the defects. A number from 1 to 5 is assigned based on the best match with the grading scale. The Martindale Average Abrasion Resistance Grade is then calculated as the average rating of all samples and reported to nearest tenth.

For the procedure conditions, the "filament cross-section type" is known, which is defined by the shape of the extrusion tool used for forming these filaments. In the event that the procedure conditions are not known, it is possible to use the following estimation: A textile sample is taken and images of filament cross-section are taken of at least 20 filaments. These cross-section images are taken in a free part of the filament, not in the location of a bond or in the location where it is in contact with another filament, since deformation can be expected in these locations. The surface of the components is marked out for every cross-section in the image, i.e. independently for each component. The position of the centre of gravity of each component is determined on the basis of determining the geometrical centre of a planar object, whilst being recorded using the Cartesian coordinate system, in which this geometric centre of the cross-section of the filament is assigned the coordinates [0; 0]. According to the following equation, the deflection (D) at the location of the centre of gravity of every component and in every filament cross-section:

D=absolute value of the product (x*y), where x and y are the coordinates of the centre of gravity. In the event that one of the values x, y is equal to 0 and concurrently is not equal to the other of these values, the sample is eliminated from the assessment.

The average value and standard deviation is calculated for every component.

The filament is considered as unformable by crimping when the ratio between the sum ((average deflection) plus (standard deviation)) and the total cross-sectional area is less than 5%.

The filament is assumed to be unformable by crimping when the ratio between the differences ((average deflection) minus (standard deviation)) and the total cross-sectional area is less than 5%.

The value of the "median filament diameter" in the layer is expressed in units of the SI system, which are micrometers (m) or nanometres (nm). To determine this median value, it is necessary to take a sample of a nonwoven textile from at least three locations that are at least 5 cm away from each other. In each of these samples, it is necessary to measure the diameter of at least 50 individual filaments in each of the investigated layers. For this purpose, it is possible to use, for example, an optical or electron microscope (depending on the diameter of the measured filaments). In the event that the diameter of filaments in one sample significantly differs from the diameters of filaments in the other two samples, it is necessary to eliminate this sample and to prepare a new one.

In the case of circular filaments, their diameter is measured as the diameter of their cross-section. In the case of any other cross-sectional shape of the filaments (e.g. in the case of filaments with a hollow or three-pointed cross-section), it is necessary to determine the size of the area of the cross-section of each measured filament and to recalculate it into a circular area having the same size. The diameter of this theoretical circular area is then the diameter of the filament.

The values measured for each layer including all three samples is then combined into a single set of values, from which the median value is subsequently determined. It applies that at least 50% of the filaments have a diameter less than or equal to the median value and at least 50% of the filaments have a diameter greater than or equal to the median value. For determining the median value for the given set of sample values, it is sufficient to arrange these values according to size and then select the value located in the middle of this list. In the event that the set of samples has an even number of items, the median value is usually determined as the arithmetic mean of the values located in the locations N/2 and N/2+1.

The term "porosity" relates here to the volume of pores in the material, which is related to the total volume take up by this material.

The total volume taken up by the material is in this case equal to the total volume of the nonwoven textile and for 1 m2 of nonwoven textile it can be calculated from the thickness value (height) of this nonwoven textile using the following equation:

total volume (m3/m2)=((height of the textile (mm)/1000)*1 (m)*1 (m))/m² of nonwoven textile The volume value of expressing the porosity of the material can then be calculated using the following equation:

Porosity=total volume of the textile (m3/m2)–volumetric weight (m3/m2)

The value of the volumetric weight weight per 1 m2 of nonwoven textile can then be calculated using the following equation:

volumetric weight (m3/m2)=(basis weight (g/m2)/1000)/weight density of the polymer (kg/m3)

The value of the weight density of the polymer can be calculated from the known composition or by means of measurement according to norm ISO 1183-3:1999, for the filament it is equal to the weighted average density specified above.

The porosity value of the material can then be calculated using the following equation:

$$\text{Porosity (\%)} = 1 - \frac{\text{basis weight}\left(\frac{g}{m^2}\right)}{\text{height of the textile (mm)} \times \text{weight density}\left(\frac{kg}{m^3}\right)} * 100\%$$

Porosity (%) = 1−(basis weight (g/m2))/

((height of the textile (mm)∗weight density (kg/m3))∗100%

Alternatively, porosity can be expressed as the free area in m3 per weight of a nonwoven textile in kg. This value can be calculated according to the following formula:

$$\text{Porosity}\left(\frac{m^3}{kg}\right) = \frac{1}{\text{basis weight}\left(\frac{g}{m^2}\right) \times \text{height of the textile (mm)}} - \frac{1}{\text{weight density}\left(\frac{kg}{m^3}\right)}$$

Porosity (m3/kg) = 1/(basis weight(g/m2)∗height of the textile (mm)) −

1/weight density (kg/m3).

In the case of layered material where there is a large difference between the individual layers, the total porosity for the entire material can be expressed, or the thickness and the basis weight of the individual layers can be set, and porosity can be subsequently calculated for the given layers.

"Bulkiness" of a nonwoven textile represents a simplified expression of porosity that is suitable only for the mutual comparison of nonwoven textiles of a similar composition or for a rough comparison. A person skilled in the field will understand that the calculation formula does not include the density of the polymer and is able to assess the suitability and limitations of this calculation.

Bulkiness (kg/m3)=basis weight (g/m2)/height of the textile (mm)

The stiffness of a nonwoven textile as expressed by the measurement "Handle-O-Meter" (HOM) is determined according to the international norm WSP 90.3. The size of the sample, unless the noted otherwise for the measured value, is 100×100 mm. HOM is measure in the MD and in the CD direction separately. Unless the MD or CD direction is specified, the arithmetic mean of these two values is taken. "Determination Method for Statistical Geometric Values of Filaments in a Nonwoven Material"

The following part of the description relates to the software methods used for the analysis of samples of nonwoven textile material for the purpose of characterising its geometrical characteristics. This method utilises the procedure for machine learning for the identification of the individual filaments contained in the sample, followed by a geometrical analysis of these filaments performed for the purpose of attaining statistical data that is suitable for characterising the material. The results include the separation of orientation and density of filaments. The work procedure that is used for the performance of this analysis was developed by the company Math2Market GmbH and is part of the digital material laboratory software GeoDict.

Step 1: Capturing a Three-Dimensional CT Image of the Sample

First, a 3D image of the sample nonwoven textile is created by digitising this sample by means of a μCT scanner. The 3D image includes a uniform Cartesian grid on which, for each of its cells (volumetric element or voxel), an attenuation value of the X-ray radiation is determined in the corresponding location of the studied sample. The area formed of pores as a rule exhibits a lower degree of this attenuation (lowest grayscale value), whilst the material phase exhibits higher values, the size of which depends on the specific material and on the arrangement of the used CT equipment.

Step 2: Segmentation of μCT Images for the Purpose of Separation of Material from the Space that Contains Pores.

For the purposes of subsequent analysis, the image which was created on the grayscale is thus subjected to filtration, which is performed with the goal of eliminating noise by means of a Non-local instrument method [1]. Subsequently, the image is converted into binary form using the global threshold value derived using Otsu's algorithm [2]. By means of this conversion to binary form, each voxel of the image is classified so as to contain either the space created by a pore or the material of the filament. Voxels with greyscale values below the threshold value are classified as space created by a pore. All the other voxels are classified as the material of the filament. For both procedures, by means of which interference is filtered out and compared to a threshold value, the ImportGeo module of the GeoDict software is used.

Step 3: Material Density Separation Analysis

Furthermore, the material density separation is calculated for the Z direction. For each image cross-section (created in the given depth in the Z direction) the material density is calculated as the number of white material voxels divided by the total number of voxels in the respective cross-section. This analysis is performed using the MatDict function in the GeoDict program.

Step 4: Using Neural Networks for Identifying Central Curves of Filaments

The main demanding task associated with distinguishing the individual filaments in μCT type images rests on the fact that for binary conversion the filaments are not mutually separated in space at the contact points. This fact may have as a consequence insufficient segmentation, where multiple objects (filaments) are erroneously classified as a single filament.

For separating the filaments, the company Math2Market GmbH created a procedure for enabling the central curves of filament to be identified. These central curves are displayed in a binary voxel image having the same size as the original image. In this image, voxels located within a distance of approx. 1-2 voxels from the centre of the filament are marked.

For this purpose, the semantic segmentation method utilising neural networks [3] was used. The image is analysed using a sliding 3D input window, which moves above this image. For each input window a smaller output window is defined, which is centred in the input window. The neutral network analyses the binary voxel values in the input window and creates a prediction for each output window voxel. The predicted value determines whether the voxel inside the output window is a part of the central curve. By combining the results gathered for all these output windows a binary image is attained, that classifies each voxel of the material in the original image. This transformation of images is performed utilising the FiberFind-AI module in the GeoDict program using the Tensorflow software library [4].

Step 5: Creating Data for Training the Neural Network

For the purposes of so-called training of the neural network, which is used for the performance of the aforementioned transformation, the company Math2Market GmbH took several artificial 3D images of nonwoven materials utilising the FiberGeo stochastic module for generating structures, which forms part of the GeoDict software program. This module generates analytical geometric visual images of filaments as rows of segments. Concurrently, it provides an output in the form of a binary image of the structure of the filaments, which is comparable with the binary conversion results performed in step 2.

By modifying the dimensions of the filaments in the analytical image by approx. 2-3 voxels, it is possible to create an image of the central curves corresponding to the artificial fibrous structure.

This pair of images (i.e. images of filaments and images of central curves) can subsequently be used to train neural networks for the purpose of converting an image of a filament to an image of a central curve. By means of this procedure, the textiles effectively "learn to shrink" filaments in the direction towards their central curves.

Step 6: Tracking Central Curves of Filaments for the Purpose of Generating a Geometrical Representation of these Filaments After reducing the filaments so that these filaments are represented only by their central curves, it is assumed that the central curves are not in mutual contact. In the subsequent separation of the individual central curves by analysis of connected components in the central curve image it is assumed that every component corresponds to the central curve of one filament. A connected component is concurrently defined as a partial set of voxels of the material, of which all have the same colour and cannot be magnified by the addition of any others voxels of the same colour that are touching each other.

For each central curve, then this set in the range of voxel sets is tracked to generate the geometrical representation of the corresponding filament in the form of a sequence of mutually connected segments (broken line). This step is, likewise, a part of the FiberFind-AI function in the GeoDict program.

Step 7: Calculation of Histogram for Separation of Orientation of Filaments

In order to find the arrangement of orientations in any plane (for example in plane XY), first every segment of the filament is projected into this plane and then the angle inside this plane is calculated. Then the histogram of orientation of angles of all segments is calculated. Finally this histogram of orientation of angles is visualised by being portrayed using polar coordinates, whilst the radius at the given angle is proportionate in count to the occurrence of the corresponding orientation. This analysis is repeated for the remaining two planes (XZ and YZ).

[1] Buades, Antoni, Bartomeu Coll a J-M. Morel, "A nonlocal algorithm for image denoising." Computer Vision and Pattern Recognition, 2005, CVPR 2005. IEEE Computer Society Conference on computer vision, sv. 2, IEEE, 2005.

[2] Otsu, Nobuyuki, "A threshold selection method from gray-level histograms." IEEE transactions on systems, man, and cybernetics 9.1 (1979): 62-66.

[3] Noh, Hyeonwoo, Seunghoon Hong a Bohyung Han, "Learning deconvolution network for semantic segmentation." Proceedings of the IEEE international conference on computer vision. 2015.

[4] Martin Abadi, Ashish Agarwal, Paul Barham, Eugene Brevdo, Zhifeng Chen, Craig Citro, Greg S. Corrado, Andy Davis, Jeffrey Dean, Matthieu Devin, Sanjay Ghemawat, Ian Goodfellow, Andrew Harp, Geoffrey Irving, Michael Isard, Rafal Jozefowicz, Yangqing Jia, Lukasz Kaiser, Manjunath Kudlur, Josh Levenberg, Dan Mané, Mike Schuster, Rajat Monga, Sherry Moore, Derek Murray, Chris Olah, Jonathon Shlens, Benoit Steiner, Ilya Sutskever, Kunal Talwar, Paul Tucker, Vincent Vanhoucke, Vijay Vasudevan, Fernanda Viégas, Oriol Vinyals, Pete Warden, Martin Wattenberg, Martin Wicke, Yuan Yu and Xiaoqiang Zheng, "TensorFlow: Large-scale machine learning on heterogeneous systems", 2015. Software is accessible at the website: tensorflow.org.

VI. INDUSTRIAL UTILITY

The invention can be utilised whenever a bulky soft nonwoven textile with increase compressibility and improved ability to recover to its initial state is required—for example in the industrial production of hygiene products, where this material, according to the invention, can be used to manufacture various part of hygiene products with absorptive characteristics (e.g. baby diapers, products for individuals suffering from incontinence, personal hygiene products, changing mats, etc.), or in healthcare, for example as a part of protective garments, surgical face masks, sheets and other products containing impermeable materials. Further application possibilities include various industrial areas, for example use as a part of protective garments, utilisation as a part of filtration, insulation, packaging and soundproofing products, utilisation in the footwear, automotive or furniture industries, etc. The invention is usable with advantage particularly in areas where increased demands are placed on bulkiness, compressibility and recovery of the textile in combination with a requirement for the inclusion of endless filaments.

For various nonwoven textile applications it is desirable to use various filament thicknesses. For example when used as a topsheet or backsheet on an absorptive hygiene product, finer filaments are more advantageous (for example in the diameter range of 10-40 microns). For example when used as the inner layer of an absorptive hygiene product slightly higher filament thicknesses are more advantageous (for example in the diameter range of 15-50 microns). For example when used in filtration products in the form of an auxiliary or capturing layer. For auxiliary layers, generally a larger filament thickness is required (approx. 30-100 microns), conversely for capturing parts, generally finer filaments are appropriate (10-40 microns). A person skilled in the art will easily set the appropriate filament thickness for their own application.

The invention claimed is:

1. Layered nonwoven textile comprising:
   a first layer (T) of filaments, comprising:
      endless filaments comprising:
         a first carrier polymer (A1;) and
         a first bonding polymer (B1), the first bonding polymer forming at least a part of a surface of the endless filaments and which has a melting temperature at least 5° C. lower than the first carrier polymer (A1), wherein the first layer (T) of filaments contains mutually spaced bonding points, which interconnect the filaments and are formed by the first bonding polymer (B1),
a second layer (M) of filaments, comprising:
filaments comprising:
a carrier material, the stiffness of which is lower than the stiffness of the first carrier polymer (A1); and
a second bonding polymer (B2), which has a melting temperature at least 5° C., lower than the carrier material and the first carrier polymer (A1),
wherein the second layer (M) of filaments contains mutually spaced bonding points, which interconnect the filaments of the second layer (M) and are formed by the second bonding polymer (B1),
wherein at least one of a median spacing distance between mutually adjacent bonding points in the first layer (T) of filaments is less than or equal to 8 mm or a median spacing distance between mutually adjacent bonding points in the second layer (M) is less than or equal to 8 mm.

2. The nonwoven textile according to claim 1, wherein the carrier material of the filaments in the second layer (M) of filaments is a second carrier polymer (A2), at least one of a tensile strength or a flexural strength of the second carrier polymer being at least 100 MPa lower than at least one of a tensile strength or a flexural strength of the first carrier polymer (A1), wherein the second bonding polymer (B2) forms at least a part of the surface of the filaments of the second layer and the filaments of the second layer (M) are endless filaments.

3. The nonwoven textile according to claim 1, wherein the melting temperatures of the first bonding polymer (B1) and of the second bonding polymer (B2) differ by 0 to 5° C., or the first bonding polymer (B1) is the same as the second bonding polymer (B2).

4. The nonwoven textile according to claim 2, wherein at least one of the first carrier polymer (A1) or the second carrier polymer (A2) comprise polymers of a type selected from the group consisting of polyolefins, polyesters, polyamides and their copolymers.

5. The nonwoven textile according to claim 1, wherein at least one of the first bonding polymer (B1) or second bonding polymer (B2) comprise polymers of a type selected from the group consisting of polyolefins, polyesters, polyamides and their copolymers.

6. The nonwoven textile according to claim 2, wherein at least one of the first carrier polymer (A1) forms at least 55% by weight of the filaments in the first layer (T) or the second carrier polymer (A2) forms less than 55% by weight of the filaments in the second layer (M).

7. The nonwoven textile according to claim 2, wherein a ratio of weighted average density of all polymers in the endless filaments of the first layer (T) to weighted average density of all polymers in the endless filaments of the second layer (M) is 1.0 to 1.5.

8. The nonwoven textile according to claim 1, wherein at least one of the filaments of the first layer (T) of filaments or the filaments of the second layer (M) of filaments are of a sheath/core type.

9. The nonwoven textile according to claim 1, wherein a median of thickness of the filaments of the first layer (T) of filaments is in the range of 0.8 to 1.5 times a median of thickness of the filaments of the second layer (M) of filaments.

10. The nonwoven textile according to claim 1, wherein a thickness of the filaments of the second layer (M) of filaments is less than 30 microns.

11. The nonwoven textile according to claim 1, wherein at least one of the first bonding polymer (B1) or the second bonding polymer contains at least 80% by weight of polyethylene.

12. Production method of a layered nonwoven textile, comprising:
a) forming a first layer of filaments, the step of forming comprising:
1) melting a first carrier polymer (A1) and a first bonding polymer (B1), the first bonding polymer having a melting temperature at least 5° C. lower than the first carrier polymer (A1);
2) feeding the first carrier polymer and the first bonding polymer into spinnerets of a first spinning beam thereby forming endless filaments which have at least a part of their surface formed by the first bonding polymer (B1);
3) cooling and drawing out the formed endless filaments; and
4) depositing the cooled and drawn endless filaments on a running belt;
b) depositing a second layer (M) of filaments onto the first layer of filaments, the filaments of the second layer (M) comprising a carrier material having a stiffness lower than a stiffness of the first carrier polymer (A1) and a second bonding polymer (B2) having a melting temperature at least 5° C. lower than that of a melting temperature of the carrier material and that of the first carrier polymer (A1);
c) consolidating the first layer (T) of filaments and the second layer of filaments by application of air heated to 100° ° C. to 250° ° C. to form bonding points within the first bonding polymer (B1) and bonding points within the second bonding polymer (B2),
wherein at least one of a median spacing distance between mutually adjacent bonding points in the first layer (T) of filaments is less than or equal to 8 mm or a median spacing distance between mutually adjacent bonding points in the second layer (M) is less than or equal to 8 mm.

13. The method according to claim 12, wherein in step b) the second bonding polymer (B2) and the carrier material are melted, the carrier material being a second carrier polymer (A2), having a flexural and tensile stiffness, which is at least 100 MPa lower than a stiffness of the first carrier polymer (A1), wherein the second carrier polymer (A2) and the second bonding polymer (B2) are fed into spinnerets of a second spinning beam to form endless filaments which have at least a part of their surface formed by the second bonding polymer (B2), wherein the formed endless filaments are cooled and drawn out and subsequently deposited on the first layer (T) of filaments on the running belt.

14. The method according to claim 12, wherein in step c) heated air acts on the layers (T, M) for a period of 200 to 20,000 ms.

15. The method according to claim 12, wherein in step c) the heated air is directed through the layers (T, M).

16. The method according to claim 15, wherein in step c) the heated air is directed through the layers (T, M) at a speed of 0.2 to 4.0 m/s.

17. The method according to claim 12, further comprising the step of pre-consolidation of layers (T, M) performed after step b), and before step c), wherein the pre-consolidation of layers is performed by heating the layers (T, M) to a temperature in a range of 80 to 180° ° C. to partially soften the first and second bonding polymers (B1, B2).

18. The method according to the claim 17, wherein in the pre-consolidation step performed after step b), heated air is applied to the layers (T, M) for 1 to 10,000 ms, wherein duration of application of the heated air in the pre-consolidation step is less than 0.5 times the time of application of the heated air in step c).

19. The method according to claim 17, wherein in the pre-consolidation step, heated air is applied to the layers (T, M), and the heated air flows through the layers (T, M) with a velocity of 0.1 to 10 m/s.

20. The method according to according to claim 12, further comprising a pre-consolidation step of the layer (T), carried out after step a), and before step b), wherein the pre-consolidation is carried out by heating the layer (T) to a temperature in the range of 80 to 180° ° C. to partially soften the first bonding polymer (B1).

\* \* \* \* \*